United States Patent
Seo et al.

(10) Patent No.: US 9,848,418 B2
(45) Date of Patent: *Dec. 19, 2017

(54) METHOD FOR OPERATING TERMINAL IN CARRIER AGGREGATION SYSTEM, AND APPARATUS USING SAID METHOD

(71) Applicant: LG ELECTRONICS INC., Seoul (KR)

(72) Inventors: Dongyoun Seo, Seoul (KR); Hakseong Kim, Seoul (KR); Joonkui Ahn, Seoul (KR); Hyukjin Chae, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/353,358

(22) Filed: Nov. 16, 2016

(65) Prior Publication Data

US 2017/0064683 A1   Mar. 2, 2017

Related U.S. Application Data

(63) Continuation of application No. 14/440,057, filed as application No. PCT/KR2013/010361 on Nov. 14, 2013, now Pat. No. 9,515,802.
(Continued)

(51) Int. Cl.
*H04W 4/00* (2009.01)
*H04W 72/04* (2009.01)
(Continued)

(52) U.S. Cl.
CPC ......... *H04W 72/042* (2013.01); *H04L 1/1861* (2013.01); *H04L 5/001* (2013.01);
(Continued)

(58) Field of Classification Search
CPC .......... H04W 72/042; H04W 72/0413; H04W 52/34; H04L 1/1861; H04L 5/001;
(Continued)

(56) References Cited

U.S. PATENT DOCUMENTS 8,995,377 B2 * 3/2015 Wang ............... H04L 5/001
370/329
9,380,568 B2 * 6/2016 Harrison ............ H04W 72/042
(Continued)

FOREIGN PATENT DOCUMENTS

| WO | 2012/118356 | 9/2012 |
| WO | 2012/124923 | 9/2012 |
| WO | 2012/128490 | 9/2012 |

OTHER PUBLICATIONS

Intel Corporation, "PUCCH resource allocation", 3GPP TSG-RAN WG1 Meeting #70bis, R1-124122, Sep. 29, 2012, 5 pages.
(Continued)

*Primary Examiner* — Kevin Mew
(74) *Attorney, Agent, or Firm* — Lee Hong Degerman Kang Waimey

(57) ABSTRACT

A method and corresponding apparatus, where the apparatus transmits, to a user equipment (UE), downlink control information (DCI) including a downlink assignment index (DAI) through an enhanced physical downlink control channel (E-PDCCH). The DCI transmitted through the E-PDCCH includes an additional field which is not present in DCI transmitted through a physical downlink control channel (PDCCH). If the DAI value included in the DCI is greater than 1, the additional field is used to determine a single resource for the ACK/NACK among the plurality of PUCCH resources configured by a higher layer signal.

10 Claims, 15 Drawing Sheets

Related U.S. Application Data

(60) Provisional application No. 61/726,517, filed on Nov. 14, 2012.

(51) Int. Cl.
  *H04L 5/00* (2006.01)
  *H04L 1/18* (2006.01)
  *H04W 52/34* (2009.01)
  *H04B 1/707* (2011.01)
  *H04J 13/00* (2011.01)

(52) U.S. Cl.
  CPC .......... *H04L 5/0053* (2013.01); *H04L 5/0055* (2013.01); *H04W 72/0413* (2013.01); *H04B 1/707* (2013.01); *H04J 13/004* (2013.01); *H04W 52/34* (2013.01)

(58) Field of Classification Search
  CPC ..... H04L 5/0053; H04L 5/0055; H04B 1/707; H04J 13/004
  See application file for complete search history.

(56) References Cited

U.S. PATENT DOCUMENTS

| | | | |
|---|---|---|---|
| 9,628,242 B2* | 4/2017 | Choi | H04L 5/0055 |
| 2012/0034927 A1 | 2/2012 | Papasakellariou et al. | |
| 2012/0176884 A1 | 7/2012 | Zhang et al. | |
| 2012/0207107 A1 | 8/2012 | Li et al. | |
| 2013/0039272 A1* | 2/2013 | Chen | H04W 76/045 |
| | | | 370/328 |
| 2013/0114530 A1* | 5/2013 | Chen | H04W 72/042 |
| | | | 370/329 |
| 2013/0188566 A1* | 7/2013 | Zhu | H04W 72/042 |
| | | | 370/329 |
| 2013/0242890 A1* | 9/2013 | He | H04W 72/042 |
| | | | 370/329 |
| 2014/0254410 A1 | 9/2014 | Seo | H04L 1/1861 |
| | | | 370/252 |
| 2014/0321422 A1 | 10/2014 | Choi | H04L 1/1861 |
| | | | 370/330 |
| 2014/0348098 A1 | 11/2014 | Lee | H04L 5/1469 |
| | | | 370/329 |
| 2015/0110034 A1 | 4/2015 | Yang | H04L 1/1861 |
| | | | 370/329 |
| 2015/0173024 A1 | 6/2015 | Seo | H04W 52/146 |
| | | | 370/329 |
| 2015/0195072 A1 | 7/2015 | Seo | H04L 1/1614 |
| | | | 370/329 |
| 2015/0223208 A1 | 8/2015 | Park | H04L 5/001 |
| | | | 370/329 |
| 2015/0319776 A1 | 11/2015 | Seo | H04L 1/18 |
| | | | 370/329 |
| 2015/0351091 A1 | 12/2015 | Yang | H04B 7/2643 |
| | | | 370/329 |
| 2016/0021655 A1 | 1/2016 | Seo | H04L 1/1829 |
| | | | 370/280 |

OTHER PUBLICATIONS

CATT, "On the necessity and methodology for PUCCH format 3 overhead analysis", 3GPP TSG RAN WG1 Meeting #66bis, R1-112941, Oct. 4, 2011, 2 pages.

Huawei et al., "Signaling design for PUCCH format 3", 3GPP TSG RAN WG1 Meeting #63, R1-105832, Nov. 9, 2010, 3 pages.

European Patent Office Application No. 13855944.8, Search Report dated Jun. 10, 2016, 12 pages.

PCT International Application No. PCT/KR2013/010361, Written Opinion of the International Searching Authority dated Feb. 25, 2014, 1 page.

* cited by examiner

METHOD FOR OPERATING TERMINAL IN CARRIER AGGREGATION SYSTEM, AND APPARATUS USING SAID METHOD

CROSS-REFERENCE TO RELATED APPLICATIONS

This application is a continuation of U.S. patent application Ser. No. 14/440,057, filed on Apr. 30, 2015, now U.S. Pat. No. 9,515,802, which is the National Stage filing under 35 U.S.C. 371 of International Application No. PCT/KR2013/010361, filed on Nov. 14, 2013, which claims the benefit of U.S. Provisional Application No. 61/726,517, filed on Nov. 14, 2012, the contents of which are all hereby incorporated by reference herein in their entirety.

BACKGROUND OF THE INVENTION

Field of the Invention

The present invention relates to wireless communications, and more particularly, to a method of operating a terminal in a carrier aggregation system, and an apparatus using the method.

Related Art

A wireless communication system may use a hybrid automatic repeat request (HARQ). The HARQ is a scheme in which a transmitter transmits data and receives acknowledgement (ACK)/not-acknowledgement (NACK) which is reception confirmation information with respect to the data, and transmits new data or retransmits the transmitted data according to the ACK/NACK.

3rd generation partnership project (3GPP) long term evolution (LTE)/long term evolution-advanced (LTE-A) may transmit the ACK/NACK through a physical uplink control channel (PUCCH) which is an uplink control channel. When the ACK/NACK is transmitted through the PUCCH, a resource in the PUCCH (i.e., a PUCCH resource) may be implicitly or explicitly determined. For example, the PUCCH resource may be determined based on a resource occupied by a physical downlink shared channel (PDSCH) which is a target of the ACK/NACK response or a control channel for scheduling data (e.g., a transmission block or a code-word). Such a PUCCH resource is called an implicit PUCCH resource. The control channel may be a physical downlink control channel (PDCCH). On the other hand, in a case where one or a plurality of resources are explicitly indicated by a higher-layer signal, and at least one of the resources is used, such a resource is called an explicit PUCCH resource.

Meanwhile, it is considered to use an additional control channel in the wireless communication system in addition to the existing PDCCH. The additional control channel is called an enhanced PDCCH (E-PDCCH). The PDCCH is distinguished from a PDSCH which is a data channel in a time domain. However, the E-PDCCH may exist in the same time domain as the PDSCH and may be distinguished only in a frequency domain. That is, the E-PDCCH may be included in a region in which the PDSCH is allocated.

User equipments (UEs) may receive data scheduled through the PDCCH or the E-PDCCH, and may transmit ACK/NACK for the data. When a PUCCH resource is implicitly used in ACK/NACK transmission of the UEs, a collision situation may occasionally occur in which the same implicit PUCCH resource is allocated between different UEs. There is a need to solve such a problem.

In addition, regarding the conventional explicit PUCCH resource, one of a plurality of resources configured by a higher layer is indicated by using a transmission power control (TPC) field included in downlink control information (DCI) transmitted through the PDCCH. The TPC field is originally used to control uplink transmission power, and is alternatively used to indicate the explicit PUCCH resource.

In case of a UE for which data is scheduled through the E-PDCCH, how to allocate and operate a PUCCH resource is a matter to be considered.

SUMMARY OF THE INVENTION

The present invention provides a method of operating a terminal in a carrier aggregation system, and the terminal using the method.

In an aspect, a method of operating a terminal in a carrier aggregation system is provided. The method comprises receiving downlink control information (DCI) including a downlink assignment index (DAI) through an enhanced physical downlink control channel (E-PDCCH) of a first subframe, receiving data scheduled by the DCI through a physical downlink shared channel (PDSCH) of the first subframe, transmitting an acknowledgement (ACK)/not-acknowledgement (NACK) for the data through a physical uplink control channel (PUCCH) in a second subframe. The DCI received in the E-PDCCH includes an additional field which is not present in DCI received in a physical downlink control channel (PDCCH), and if the DAI value is greater than 1, the additional field is used to select a single resource among a plurality of PUCCH resources configured by a higher layer, and the single resource is used to transmit the ACK/NACK.

In another aspect, a terminal operating in a carrier aggregation system is provided. The terminal comprises a radio frequency (RF) unit for transmitting and receiving a radio signal and a processor operatively coupled to the RF unit.

The processor is configured for receiving downlink control information (DCI) including a downlink assignment index (DAI) through an enhanced physical downlink control channel (E-PDCCH) of a first subframe, receiving data scheduled by the DCI through a physical downlink shared channel (PDSCH) of the first subframe, transmitting an acknowledgement (ACK)/not-acknowledgement (NACK) for the data through a physical uplink control channel (PUCCH) in a second subframe. The DCI received in the E-PDCCH includes an additional field which is not present in DCI received in a physical downlink control channel (PDCCH), and if the DAI value is greater than 1, the additional field is used to select a single resource among a plurality of PUCCH resources configured by a higher layer, and the single resource is used to transmit the ACK/NACK.

In a carrier aggregation system supporting an enhanced physical downlink control channel (E-PDCCH) other than a physical downlink control channel (PDCCH) which is a conventional control channel, a PUCCH resource for acknowledgement (ACK)/not-acknowledgement (NACK) transmission can be effectively configured, and transmission power control signaling can also be effectively performed.

DESCRIPTION OF EXEMPLARY EMBODIMENTS

User Equipment (UE) may be fixed or mobile, and may be called other terms such as an MS (mobile station), an MT (mobile UE), a UT (user UE), an SS (subscriber station), a wireless device, a PDA (personal digital assistant), a wireless modem, a handheld device, and the like.

Generally, a base station means a fixed station communicating with the UE, and may be called as other terms such as an eNB (evolved-NodeB), a BTS (Base Transceiver System), and an Access Point.

Figure 1:
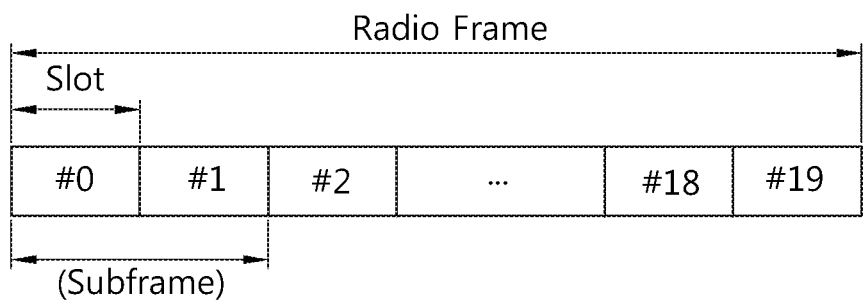
FIG. 1 illustrates a structure of a frequency division duplex (FDD) radio frame in a 3GPP LTE.

FIG. 1 illustrates a structure of a frequency division duplex (FDD) radio frame in a 3GPP LTE. The structure of a frequency division duplex (FDD) radio frame may refer to a fourth section of 3GPP TS 36.211 V8.7.0 (2009 May) "Evolved Universal Terrestrial Radio Access (E-UTRA); Physical Channels and Modulation (Release 8)".

The radio frame includes 10 subframes marked with indexes of 0~9. One subframe includes two continuous slots. A time required to transmit one subframe is a TTI (transmission time interval). For example, a length of one subframe may be 1 ms (milli-second), and a length of one slot may be 0.5 ms.

Figure 2:
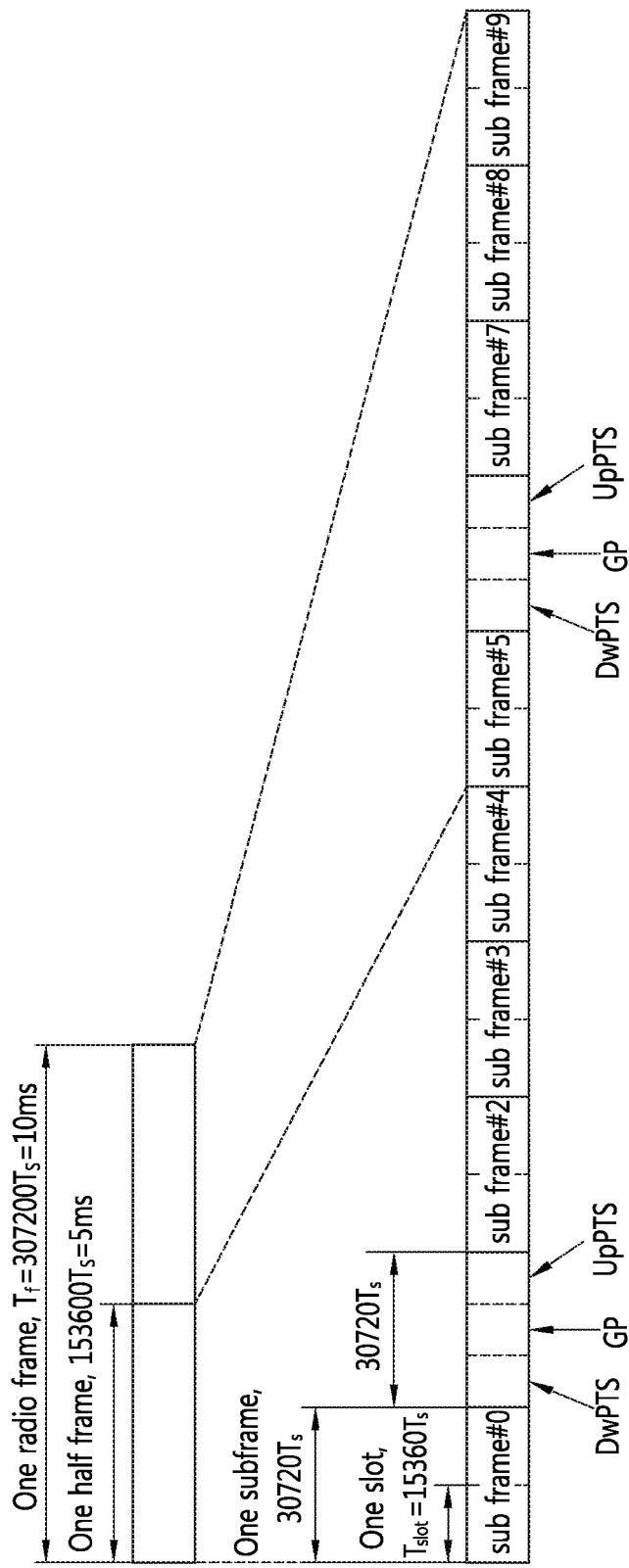
FIG. 2 illustrates a structure of a time division duplex (TDD) radio frame in a 3GPP LTE.

FIG. 2 illustrates a structure of a time division duplex (TDD) radio frame in a 3GPP LTE. A time interval of one radio frame has the relationship of 307200·Ts=10 millisecond (ms).

A downlink (DL) subframe, a Uplink (UL) subframe, and a special subframe (S subframe) may coexist in the TDD radio frame.

Table 1 describes an example of UL-DL configuration of a radio frame.

TABLE 1

| UL-DL config- uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

| UL-DL config- uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table 1, the 'D' represents a DL subframe, the 'U' represents an UL subframe, and the 'S' represents a special subframe. If the UL-DL configuration is received from the base station, the UE may know which subframe in the radio frame is a DL subframe or an UL subframe according to the UL-DL configuration.

Meanwhile, when 10 subframes are indexed from 0 to 9 in the radio frame, a subframe having subframe indexes #1 and #6 may include a special subframe. The special subframe includes a Downlink Pilot Time Slot (DwPTS), a Guard Period (GP), and an Uplink Pilot Time Slot (UpPTS). The DwPTS is used for initial cell search, synchronization or channel estimation in the UE. The UpPTS is used for channel estimation in the base station and uplink transmission synchronization of the UE. The GP is an interval to remove interference caused in uplink due to multi-path delay of an uplink signal between uplink and downlink.

Figure 3:
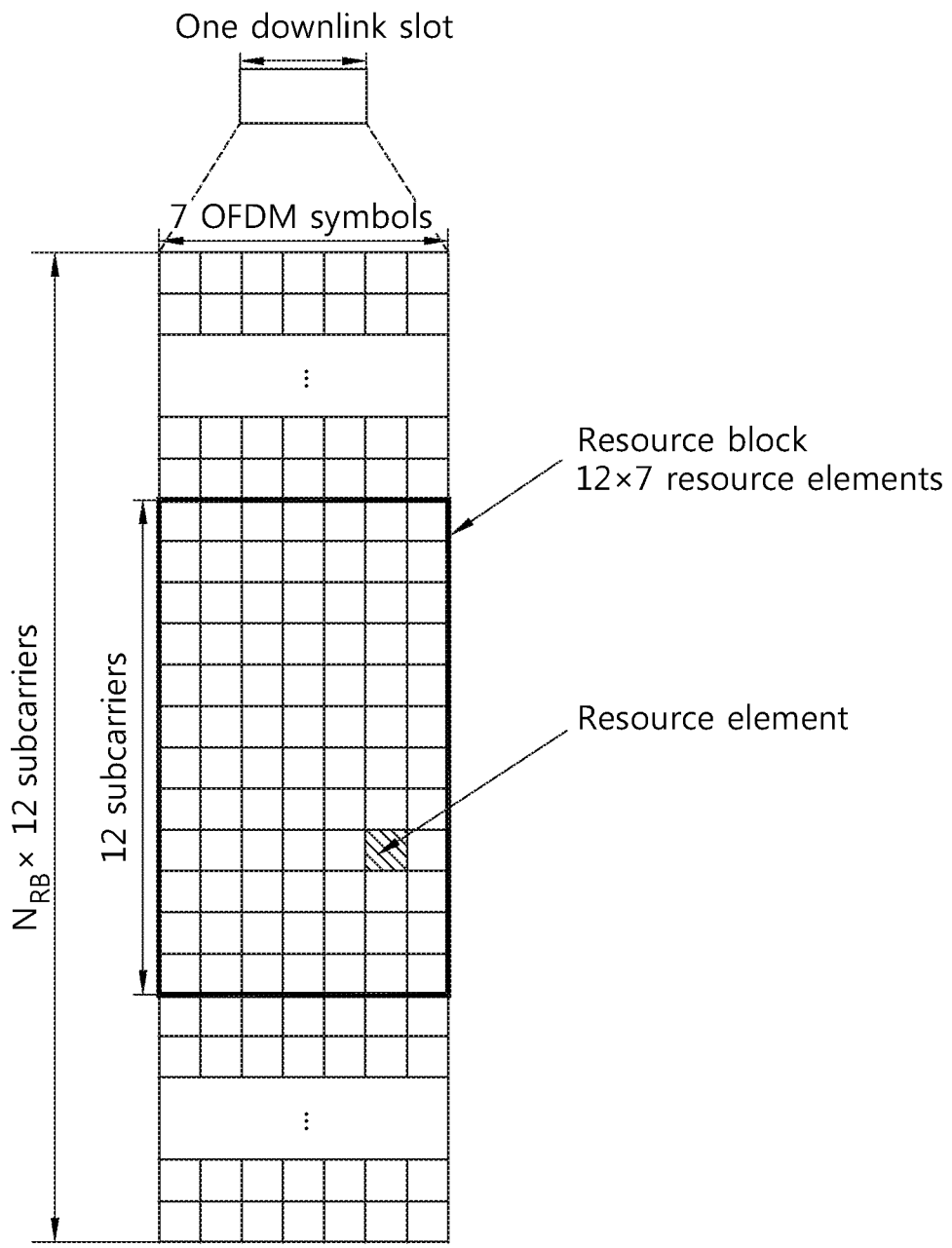
FIG. 3 illustrates an example of a resource grid with respect to one downlink slot.

FIG. 3 illustrates an example of a resource grid with respect to one downlink slot.

Referring to FIG. 3, a downlink slot includes a plurality of OFDM symbols in a time domain and $N_{RB}$ Resource Blocks (RBs) in a frequency domain. The RB includes one slot in the time domain in a resource allocation unit, and a plurality of continuous sub-carriers in a frequency domain. The number $N_{RB}$ of RBs included in the downlink slot depends on a downlink transmission bandwidth set in a cell. For example, the number $N_{RB}$ of RBs in the LTE system may be one of 6 to 110. A structure of the uplink slot may be the same as a structure of the downlink slot.

Meanwhile, each element on the resource grid is a resource element (RE). The resource element on the resource grid may be identified by an index pair (k,l) in a slot. In this case, a k (k=0, . . . , $N_{RB} \times 12-1$) represents a sub-carrier index, and l (l=0, . . . , 6) represents an OFDM symbol index in the slot.

Although FIG. 3 has illustrated that one RB is configured by 7 OFDM symbols in a time domain and 12 sub-carriers in a frequency domain to include 7×12 resource elements, and the number of OFDM symbols and the number of sub-carriers in the RB are not limited thereto. A 1 slot in a normal CP may include 7 OFDM symbols, and a 1 slot in an extended CP may include 6 OFDM symbols. The number of the OFDM symbols and the number of the sub-carriers may be variously changed according to a length of the CP, a frequency spacing, and the like. One of 128, 256, 512, 1024, 1536, and 2048 may be selectively used as the number of sub-carriers in one OFDM symbol.

Figure 4:
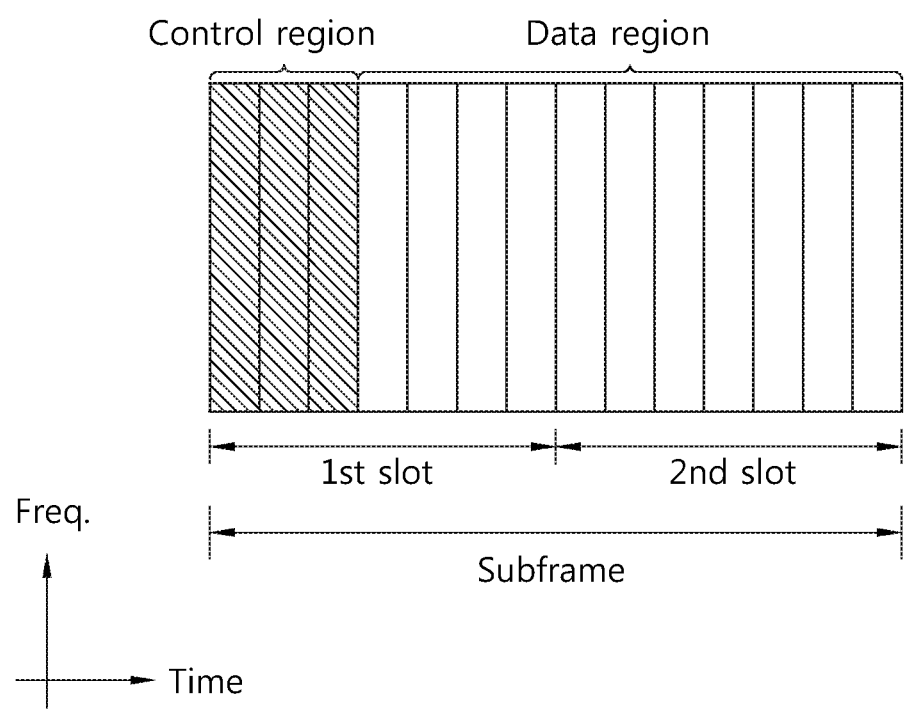
FIG. 4 illustrates a downlink subframe.

FIG. 4 illustrates a downlink subframe.

A downlink (DL) subframe is divided into a control region and a data region in a time region. The control region include maximum 4 OFDM symbols before a first slot in a subframe, but the number of OFDM symbols included in the control region may be changed. A PDCCH (Physical Downlink Control Channel) and other control channel are allocated to the control region, and a PDSCH is allocated to the data region.

As disclosed in 3GPP TS 36.211 V10.2.0, a physical control channel in a 3GPP LTE/LTE-A includes a PDCCH (Physical Downlink Control Channel), a PCFICH (Physical Control Format Indicator Channel), and a PHICH (Physical Hybrid-ARQ Indicator Channel).

A PCFICH transmitted from a first OFDM symbol of the subframe transfers a CFI (control format indicator) regarding the number of OFDM symbols (that is, a size of the control region) used to transmit control channels in the subframe. A wireless device firstly receives a CFI on the PCFICH, and then monitors the PDCCH. Unlike the PDCCH, the PCFICH does not use blind decoding, but is transmitted through a fixed PCFICH resource of the subframe.

The PHICH transfers ACK (acknowledgement)/NACK (not-acknowledgement) signals for uplink (UL) HARQ (hybrid automatic repeat request) process. The ACK/NACK signals regarding UL data on the PUSCH transmitted by the UE are transmitted on the PHICH by the base station.

A PBCH (Physical Broadcast Channel) is transmitted from four OFDM symbols before a second slot of a first subframe of the radio frame. The PBCH transfers essential system information to communicate with the base station, and the system information transmitted through the PBCH refers to MIB (master information block). Meanwhile, system information transmitted on a PDSCH indicated by the PDCCH refers to an SIB (system information block).

Control information transmitted through the PDCCH refers to downlink control information (DCI). The DCI may include resource allocation of the PDSCH (refers to DL grant (downlink grant) or DL assignment (DL assignment)), resource allocation of PUSCH (refers to UL grant), a set of transmission power control commands and/or activation of VoIP (Voice over Internet Protocol) with respect to individual UEs in a predetermined UE group.

The conventional DCI formats transmitted through the PDCCH will be described.

A DCI format includes fields described below, and the respective fields may be mapped to information bits $a_0$ to $a_{A-1}$. The respective fields may be mapped in an order described in the respective DCI formats. Each field may have zero-padding bits. A first field may be mapped to an information bit $a_0$ having a lowest order, and consecutive other fields may be mapped to information bits having higher orders. In each field, a most significant bit (MSB) may be mapped to an information bit having a lowest order of a corresponding field. For example, an MSB of the first field may be mapped to $a_0$. Hereinafter, a set of fields included in the respective conventional DCI formats is called an information field.

1. DCI Format 0

A DCI format 0 is used for PUSCH scheduling. Examples of information (field) transmitted by using the DCI format 0 are as follows.

1) a flag for identifying the DCI format 0 and a DCI format 1A (if the flag is 0, it indicates the DCI format 0, and if the flag is 1, it indicates the DCI format 1A), 2) a hopping flag (1 bit), 3) a resource block designation and a hopping resource allocation, 4) a modulation and coding scheme and a redundancy version (5 bits), 5) a new data indicator (1 bit), 6) a TPC command (2 bits) for a scheduled PUSCH, 7) a cyclic shift (3 bits) for DM-RS, 8) a UL index, 9) a downlink designation index (only in a TDD), 10) CQI request, etc. If the number of information bits in the DCI format 0 is less than a payload size of the DCI format 1A, zero padding is performed to be equal to the payload size of the DCI format 1A.

2. DCI Format 1

A DCI format 1 is used for one PDSCH codeword scheduling. Examples of information transmitted in the DCI format 1 are as follows.

1) a resource allocation header (indicating a resource allocation type 0/type 1)—if a DL bandwidth is less than 10 PRBs, the resource allocation header is not included and the resource allocation type 0 is assumed. 2) a resource block designation, 3) a modulation and coding scheme, 4) an HARQ process number, 5) a new data indicator, 6) a redundancy version, 7) a TPC command for a PUCCH, 8) a downlink designation index (DAI) (only in a TDD), etc. If the number of information bits of the DCI format 1 is equal to that of the DCI format 0/1A, one bit having a value of '0' is added to the DCI format 1. If the number of information bits in the DCI format 1 is equal to any one of {12, 14, 16, 20, 24, 26, 32, 40, 44, 56}, a bit having one or more values of '0' is added to the DCI format 1 so that it is different from {12, 14, 16, 20, 24, 26, 32, 40, 44, 56} and has a payload size different from that of the DCI format 0/1A.

3. DCI Format 1A

A DCI format 1A is used for compact scheduling of one PDSCH codeword or a random access process.

Examples of information transmitted in the DCI format 1A are as follows. 1) a flag for identifying the DCI format 1A and the DCI format 1A, 2) a localized/distributed VRB designation flag, 3) a resource block designation, 4) a modulation and coding scheme, 5) an HARQ process number, 6) a new data indicator, 7) a redundancy version, 8) a TPC command for a PUCCH, 9) a DAI (only in a TDD), etc. If the number of information bits of the DCI format 1A is less than the number of information bits of the DCI format 0, bits having a value of '0' are added so that it has the same size as the payload size of the DCI format 0. If the number of information bits in the DCI format 1A is equal to any one of {12, 14, 16, 20, 24, 26, 32, 40, 44, 56}, a bit having one value of '0' is added to the DCI format 1A.

4. DCI Format 1B

A DCI format 1B includes precoding information and is used for compact scheduling for one PDSCH codeword. Examples of information transmitted in the DCI format 1B are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DAI (only in a TDD), 9) transmitted precoding matrix indicator (TPMI) information for precoding, 10) a PMI confirmation for precoding, etc. If the number of information bits in the DCI format 1B is equal to any one of {12, 14, 16, 20, 24, 26, 32, 40, 44, 56}, a bit having one value of '0' is added to the DCI format 1B.

5. DCI Format 1C

A DCI format 1C is used for very compact scheduling for one PDSCH codeword. Examples of information transmitted in the DCI format 1C are as follows.

1) an indicator indicating a gap value, 2) a resource block designation, 3) a transport block size index, etc.

6. DCI Format 1D

A DCI format 1D includes precoding and power offset information and is used for compact scheduling for one PDSCH codeword.

Examples of information transmitted in the DCI format 1D are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DAI (only in a TDD), 9) TPMI information for precoding, 10) a downlink power offset, etc. If the number of information bits in the DCI format 1D is equal to any one of {12, 14, 16, 20, 24, 26, 32, 40, 44, 56}, a bit having one value of '0' is added to the DCI format 1D.

7. DCI Format 2

A DCI format 2 is used to designate a PDSCH for a close-loop MIMO operation. Examples of information transmitted in the DCI format 2 are as follows.

1) a resource allocation header, 2) a resource block designation, 3) a TPC command for a PUCCH, 4) a DAI (only in a TDD), 5) an HARQ process number, 6) a transport block to codeword swap flag, 7) a modulation and coding scheme, 8) a new data indicator, 9) a redundancy version, 10) precoding information, etc.

8. DCI Format 2A

A DCI format 2A is used to designate a PDSCH for an open-loop MIMO operation. Examples of information transmitted in the DCI format 2A are as follows.

1) a resource allocation header, 2) a TPC command for a PUCCH, 3) a DAI (only in a TDD), 4) an HARQ process number, 5) a transport block to codeword swap flag, 6) a modulation and coding scheme, 7) a new data indicator, 8) a redundancy version, 9) precoding information, etc.

9. DCI Format 3

A DCI format 3 is used to transmit a TPC command for a PUCCH and a PUSCH through 2-bit power regulation. Examples of information transmitted in the DCI format 3 are as follows.

N transmit power control (TPC) commands.

10. DCI Format 3A

A DCI format 3A is used to transmit a TPC command for a PUCCH and a PUSCH through 1-bit power regulation. Examples of information transmitted in the DCI format 3A are as follows.

M TPC Commands

In addition thereto, DCI formats 2B, 2C, 2D, 4, or the like may exist. Among the DCI formats, the DCI formats 0 and 4 are used for an uplink, and the remaining DCI formats are used for a downlink. Accordingly, the remaining DCI formats may be called DL DCI formats.

Meanwhile, transmission of a DL transmission block in a 3GPP LTE/LTE-A is performed a pair of the PDCCH and the PDSCH. Transmission of a UL transmission block is performed a pair of the PDCCH and the PDSCH. For example, the wireless device receives a DL transmission block on a PDSCH indicated by the PDCCH. The wireless device monitors the PDCCH in a DL subframe, and receives DL resource assignment on the PDCCH. The radio device receives a DL transmission block on a PDSCH indicated by the DL resource assignment.

The base station determines a PDCCH format according to a DCT to be sent to the wireless device to attach a CRC (Cyclic Redundancy Check) to a DCI, and masks unique identifier (refers to RNTI (Radio Network Temporary Identifier) according an owner or an application the PDCCH to CRC.

In a case of a PDCCH for a specific wireless device, an unique identifier of the wireless device, for example, a C-RNTI (Radio Network Temporary Identifier) may be masked to the CRC. Alternatively, in a case of a PDCCH for a paging message, a paging indication identifier, for example, a P-RNTI (Paging-RNTI) may be masked to the CRC. In a case of a PDCCH for system information, system information identifier, that is, SI-RNTI (system information-RNTI) may be masked to the CRC. In order to indicate a random access response being a response to transmission of the random access preamble, RA-RNTI (random access-RNTI) may be masked to the CRC. So as to indicate a TPC (transmit power control) command with respect to a plurality of wireless devices, TPC-RNTI may be masked to the CRC. In a PDCCH for semi-persistent scheduling (SPS), SPS-C-RNTI may be masked to the CRC. The SPS will be describer later.

If C-RNTI series (for example, C-RNTI, SPS-C-RNTI, Temporary C-RNTI) are used, the PDCCH transfer control information (refers to UE-specific control information) for a corresponding specific wireless device. If other RNTI is used, the PDCCH transfers common control information received by all or a plurality of wireless devices in a cell.

A DCI to which the CRC is added is encoded to generate coded data. Encoding includes channel encoding and rat matching. The coded data are modulated to generate modulated symbols. The modulated symbols are mapped to a physical RE (resource element).

The control region in the subframe includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements (REs). According to the relationship between the number of CCEs and a coding rate provided by the CCEs, a format of the PDCCH and the bit number of possible PDCCHs are determined.

One REG includes four REs, and one CCE includes 9 REGs. In order to configure one PDCCH, {1, 2, 4, 8} CCE may be used. Each element of {1, 2, 4, 8} refers to a CCE aggregation level.

The base station determines the number of CCEs used to transmit the PDDCH is determined according to a channel state. For example, one CCE may be used to transmit the PDCCH in a wireless device having an excellent downlink channel state. 8 CCEs may be used to transmit the PDCCH in a wireless device having a poor downlink channel state.

A control channel configured by one or more CCEs performs interleaving of an REG unit, and is mapped to a physical resource after cyclic shift base a cell ID is performed.

Figure 5:
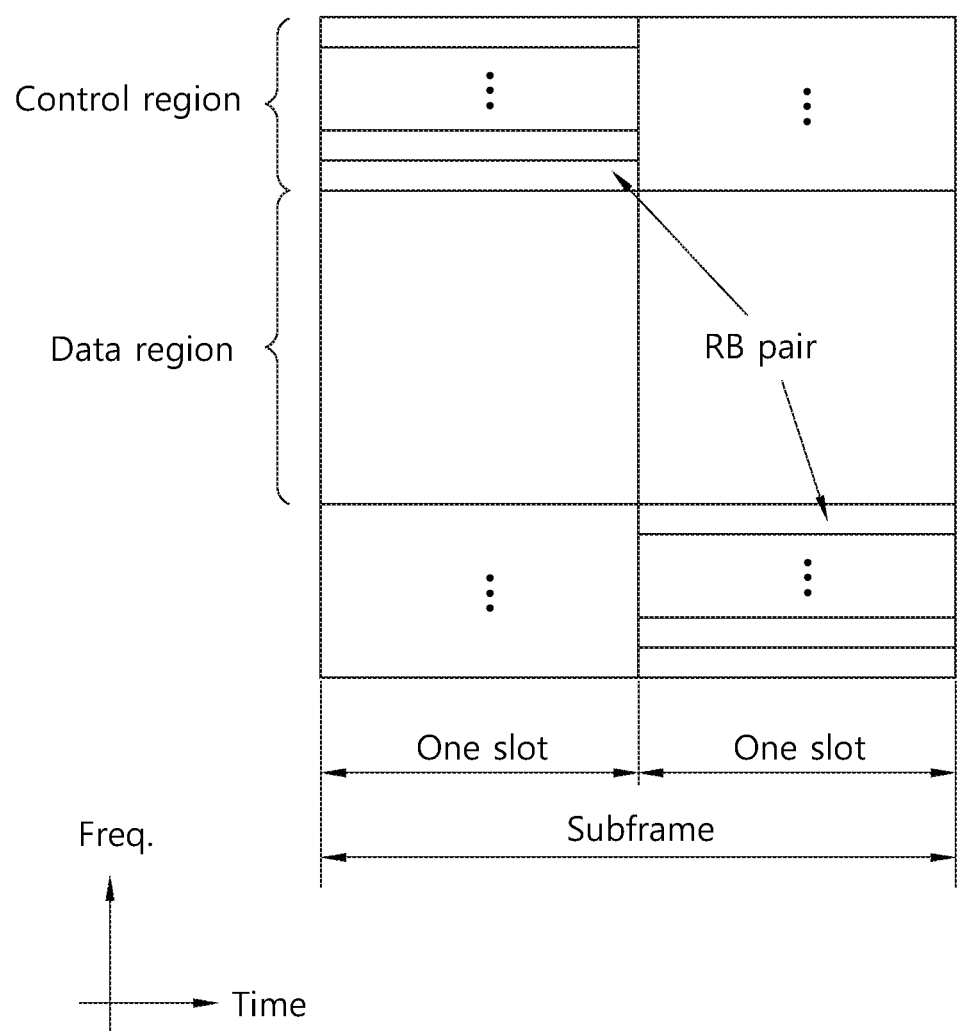
FIG. 5 illustrates an uplink subframe.

FIG. 5 illustrates an uplink subframe.

Referring to FIG. 5, the uplink subframe may be divided into a control region and a data region in a frequency region. A PUCCH (Physical Uplink Control Channel) for transmitting uplink control information is allocated to the control region. A PUSCH (Physical Uplink Shared Channel) for transmitting data (control information may be transmitted together with the data in some cases) is allocated to the data region. The UE may simultaneously transmit the PUCCH and the PUSCH or may transmit only one of the PUCCH and the PUSCH according to setting.

The PUCCH with respect to one UE is allocated as a RB pair in a subframe. RBs belonging to the RB pair have different sub-carriers in a first slot and a second slot, respectively. A frequency of an RB belonging to the RB pair allocated to the PUCCH is changed based on a slot boundary. This means that a frequency of an RB pair allocated to the PUCCH is hopped in a slot boundary. The uplink control information is transmitted through different sub-carriers according to a time so that a frequency diversity gain may be obtained.

HARQ ACK/NACK (hereinafter simply referred to as 'ACK/NACK' or 'HARQ-ACK'), channel status information (CSI) representing a downlink channel state, for example, a CQI (Channel Quality Indicator), a PMI (precoding matrix index), a PTI (precoding type indicator), an RI (rank indication), and the like may be transmitted on the PUCCH.

The CQI provides information on a link adaptive parameter supported from the UE with respect to a given time. The CQI may indicate a data rate which may be supported by a downlink channel by taking a characteristic and an SINR (signal to interference plus noise ratio) of a UE receiver into consideration. The base station may modulation (QPSK, 16-QAM, 64-QAM, and the like) and a coding rate to be applied to downlink channel using a CQI. The CQI may be generated in various schemes. For example, the various schemes include a scheme to quantize and feedback a channel state as it is, a scheme to calculate and feedback the SINR (signal to interference plus noise ratio), and a scheme such as an MCS (Modulation Coding Scheme) to report a really applied state to the channel. When the CQI is generated based on the MCS, the MCS includes a modulation scheme, and a coding scheme, and a coding rate according thereto.

The PMI provides information on a precoding matrix in pre-coding of a code-book base. The PMI is associated with an MIMO (multiple input multiple output). Feedback of the PMI in the MIMO refers to a closed loop MIMO.

An RI is information on a rank (that is, the number of layers) recommended by the UE. That is, the RI represents the number of independent streams used for space multiplexing. Only when the UE is operated in an MIMO mode using the space multiplexing, the RI performs feedback. The RI is always associated with at least one CQI feedback. The feedback CQI is calculated by assuming a specific RI value. In general, since the rank of the channel is changed slower than the CQI, the RI performs feedback less than the feedback number of the CQI. A transmission period of the RI may be a multiple of CQI/PMI transmission period. The RI is given with respect to the whole system band, and a selective frequency RI feedback is not supported.

The PUCCH transfers various types of control information according to a format. The PUCCH format 1 transfers a scheduling request (SR). In this case, an On-Off Keying (OOK) scheme is applicable. A PUCCH format 1a transfers ACK/NACK modulated in a Binary Phase Shift Keying (BPSK) scheme with respect to one code-word. A PUCCH format 1b transfers the ACK/NACK modulated in a Quadrature Phase Shift Keying (QPSK) scheme with respect to two code-words. A PUCCH format 2 transfers a Channel Quality Indicator (CQI) modulated in the QPSK scheme. PUCCH formats 2a and 2b transfer the CQI and the ACK/NACK, respectively.

The PUCCH format may be classified according to a modulation scheme and the number of transmittable bits per subframe. A following table indicates the modulation scheme and the number of bits in the subframe.

TABLE 2

| PUCCH format | Modulation scheme | The number of bits per subframe |
| --- | --- | --- |
| 1 | N/A | N/A |
| 1a | BPSK | 1 |
| 1b | QPSK | 2 |
| 2 | QPSK | 20 |

TABLE 2-continued

| PUCCH format | Modulation scheme | The number of bits per subframe |
| --- | --- | --- |
| 2a | QPSK + BPSK | 21 |
| 2b | QPSK + QPSK | 22 |

All PUCCH formats use cyclic shift (CS) of a shift in each OFDM symbol. The cyclic shifted sequence is generated by cyclically shifting a base sequence by a specific CS amount. A specific CS amount is indicated by a CS index.

An example of defining a base sequence $r_u(n)$ is as follows.

$$r_u(n) = e^{jb(n)\pi/4} \quad \text{[Equation 1]}$$

In the equation 1, the u represents a root index, the n represents an element index and $0 \le n \le N-1$, and the N is a length of the base sequence. The b(n) is defined in a section 5.5 of 3GPP TS 36.211 V8.7.0.

The length of the sequence is the same as the number of elements included in the sequence. The u may be defined by a cell ID (identifier) and a slot number in the radio frame. When the base sequence is mapped to one resource block in a frequency domain, since one resource block include 12 sub-carriers, the length of the base sequence is 12. Other base sequence is defined according to other root index.

A cyclic shifted sequence $r(n, I_{cs})$ may be generated by cyclically shifting the root sequence r(n) as follows.

$$r(n, I_{cs}) = r(n) \cdot \exp\left(\frac{j2\pi I_{cs} n}{N}\right), \quad 0 \le I_{cs} \le N-1 \quad \text{[Equation 2]}$$

In equation 2, the $I_{cs}$ represents a cyclic shift index ($0 \le I_{cs} \le N-1$) indicating a CS amount.

An available cyclic shift index of the base sequence means a cyclic shift index which may be derived from the base sequence according to a CS interval. For example, if the length of the base sequence is 12 and the CS interval is 1, the total number of available cyclic shift indexes of the base sequence is 12. Further, if the length of the base sequence is 12 and the CS interval is 2, the total number of available cyclic shift indexes of the base sequence is 6.

Figure 6:
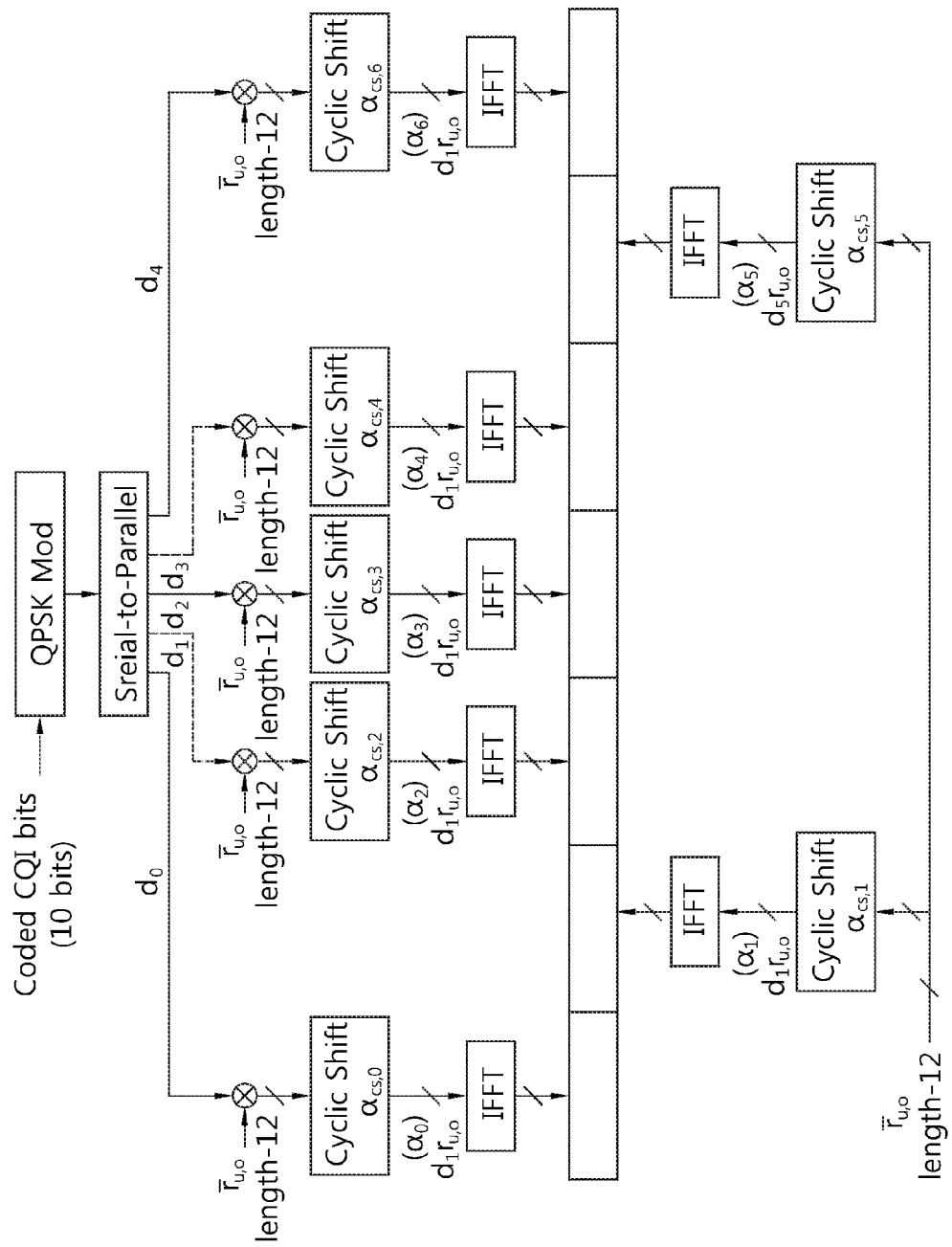
FIG. 6 illustrates a channel structure of a PUCCH format 2/2a/2b with respect to one slot in a normal CP.

FIG. 6 illustrates a channel structure of a PUCCH format 2/2a/2b with respect to one slot in a normal CP. As described above, the PUCCH format 2/2a/2b is used to transmit a CQI.

Referring to FIG. 6, SC-FDMA symbols 1 and 5 are used for a DM RS (demodulation reference symbol) which is a uplink reference signal. In a case of the CP, an SC-FDMA (single carrier-frequency division multiple access) symbol 3 is used for a DM RS.

10 CQI information bits are channel-coded with, for example, a 1/2 rate to be 20 coded bits. A Reed-Muller (RM) may be used for the channel coding. Further, after scrambling (PUSCH data is scrambled to a gold sequence having a length 31), a QPSK constellation mapping is performed so that a QPSK modulation symbol is generated ($d_0$ to $d_4$ in a slot 0). After each QPSK modulation symbol is modulated to a cyclic shift of a base RS sequence having a length 12 and is OFDM-modulated, 10 SC-FDMA symbols in a subframe are transmitted. 12 uniformly spaced cyclic shifts may be multiplexed so that different UEs are orthogonal to each other in the same PUCCH resource block. A DM RS sequence applied to the SC-FDMA symbols 1 and 5 may use a base RS sequence having a length 12.

Figure 7:
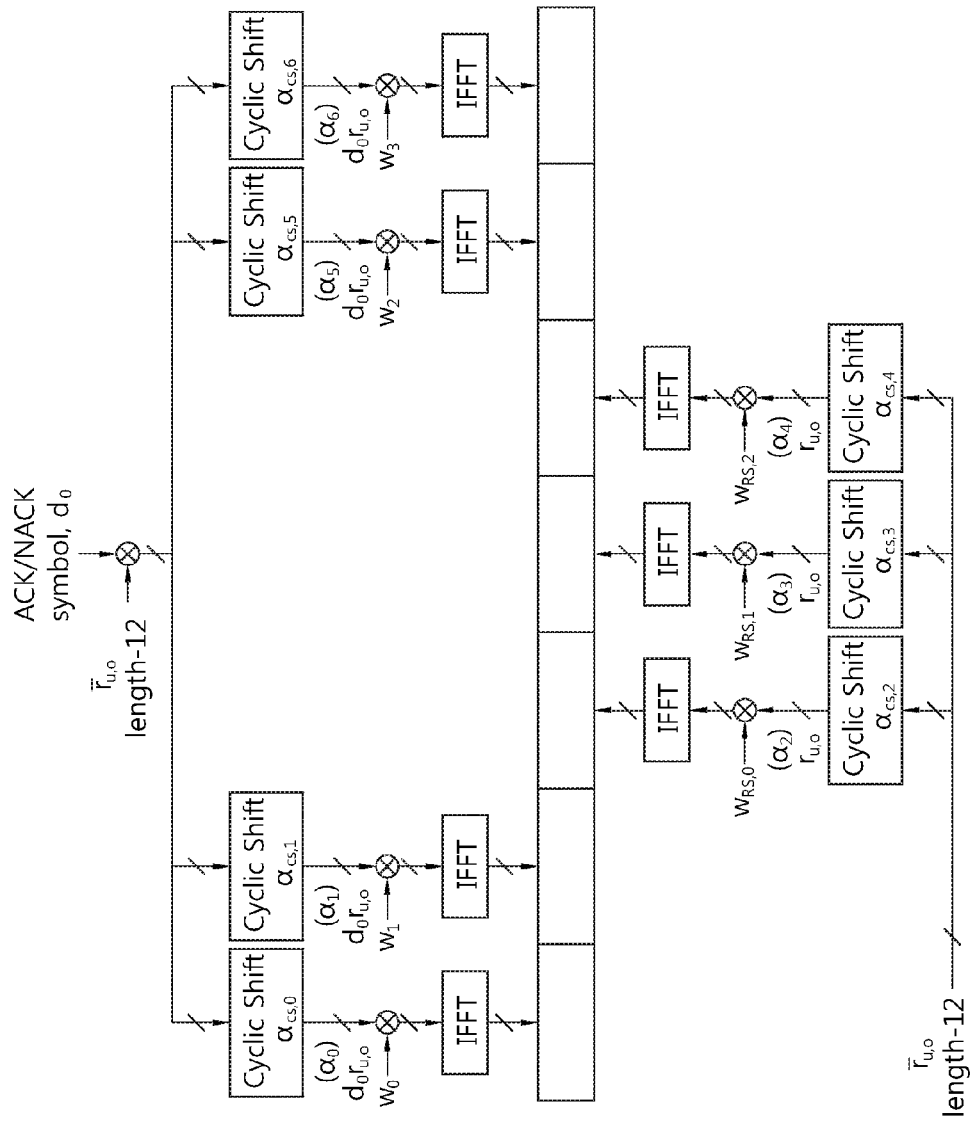
FIG. 7 illustrates a PUCCH format 1a/1b with respect to one slot in a normal CP.

FIG. 7 illustrates a PUCCH format 1a/1b with respect to one slot in a normal CP. A uplink reference signal is transmitted in third to fifth SC-FDMA symbols. In FIG. 7, after IFFT (Inverse Fast Fourier Transform) for $w_0$, $w_1$, $w_2$, and $w_3$ is performed, the $w_0$, $w_1$, $w_2$, and $w_3$ may be modulated in a time domain and may be modulated in a frequency domain before IFFT modulation.

One symbol includes seven OFDM symbols, 3 OFDM symbols become an RS (Reference Signal) OFDM symbol for a reference signal, and 4 OFDM symbols become a data OFDM symbol for ACK/NACK signals.

In a PUCCH format 1b, encoded 2 bit ACK/NACK signals are QPSK (Quadrature Phase Shift Keying)-modulated so that a modulation symbol d(0) is generated.

A cyclic shift index $I_{cs}$ may be changed according to a slot number $n_s$ in a radio frame and/or a symbol index l in a slot.

Since there are 4 data OFDM symbols to transmit ACK/NACK signals to one slot in a normal CP, it is assumed that cyclic shift indexes corresponding to each data OFDM symbol are $I_{cs0}$, $I_{cs1}$, $I_{cs2}$, and $I_{cs3}$.

A modulation symbol d(0) is extended to a cyclic shifted sequence $r(n, I_{cs})$. If one dimensional spread sequence corresponding to an (i+1)-th OFDM symbol in the slot is m(i), {m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}.

In order to increase a capacity of the UE, the one dimensional spread sequence may be spread using an orthogonal sequence. An orthogonal sequence $w_i(k)$ (I represents a sequence index, 0≤k≤K−1) having spreading factor K=4 uses a following sequence.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (i represents a sequence index, 0≤k≤K−1) having spreading factor K=3 uses a following sequence.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

Different spreading coefficients may be used according to the slot.

Accordingly, when an optional orthogonal sequence index i is given, two dimensional spread sequences {s(0), s(1), s(2), s(3)} may be expressed as follows.
{s(0), s(1), s(2), s(3)}={$w_i(0)$m(0), $w_i(1)$m(1), $w_i(2)$m(2), $w_i(3)$m(3)}

After an IFFT for the two dimensional sequences {s(0), s(1), s(2), s(3)} is performed, the sequences are transmitted in a corresponding OFDM symbol. Accordingly, the ACK/NACK signals are transmitted on a PUCCH.

A reference signal of a PUCCH format 1b is spread and transmitted as an orthogonal sequence after cyclically shifting the base sequence r(n). If cyclic shift indexes corresponding to three RS OFDM symbols are $I_{cs4}$, $I_{cs5}$, and $I_{cs6}$, three cyclic shifted sequences $r(n,I_{cs4})$, $r(n,I_{cs5})$, $r(n,I_{cs6})$ may be obtained. The three cyclic shifted sequence are spread to an orthogonal sequence $w_{RS,i}(k)$ of K=3.

The orthogonal sequence index i, the cyclic shift index $I_{cs}$ and the resource block index m may include a parameter necessary to configure the PUCCH and a resource used to identify the PUCCH (or UE). If the number of available cyclic shifts is 12 and the number of available orthogonal sequence indexes is 3, a PUCCH with respect to 36 UEs may be multiplexed to one resource block.

In the 3GPP LTE, $n^{(1)}_{PUCCH}$ is defined when the UE acquires three parameters to configure the PUCCH. A resource index is defined as $n^{(1)}_{PUCCH}=n_{CCE}+N^{(1)}_{PUCCH}$. The $n_{CCE}$ represents an index of a first CCE (CCE having the lowest index) used to transmit a corresponding DCI (that is, downlink resource allocation to receive downlink data being a target of the ACK/NACK signals), and $N^{(1)}_{PUCCH}$ represents where the base station reports to the UE as a higher layer message.

Hereinafter, a time, a frequency, and a code resource used to transmit the ACK/NACK signals refer to ACK/NACK resources or PUCCH resources. As described above, an index to determine the PUCCH resource (refer to PUCCH index), that is, an index necessary to transmit ACK/NACK signals on a PUCCH may be expressed by at least one of {orthogonal sequence index i, cyclic shift index $I_{cs}$, resource block index m} or an index ($n^{(1)}_{PUCCH}$) to obtain the three indexes. That is, the PUCCH resource may include at least one of an orthogonal sequence, a cyclic shift, a resource block, and a combination thereof. The index indicating the PUCCH resource may refer to a PUCCH index.

Meanwhile, in an LTE-A, a PUCCH format 3 is introduced to transmit uplink control information (for example, ACK/NACK and SR) of maximum 21 bits (the number of bits before channel coding as information bit, maximum 22 bits when an SR is included). The PUCCH format 3 uses a QPSK in a modulation scheme, and the number of transmittable bits in a subframe is 48 bits).

The PUCCH format 3 performs block spreading based transmission. A modulation symbol sequence obtained by modulating a multi-bit ACK/NACK using a block spreading code.

Figure 8:
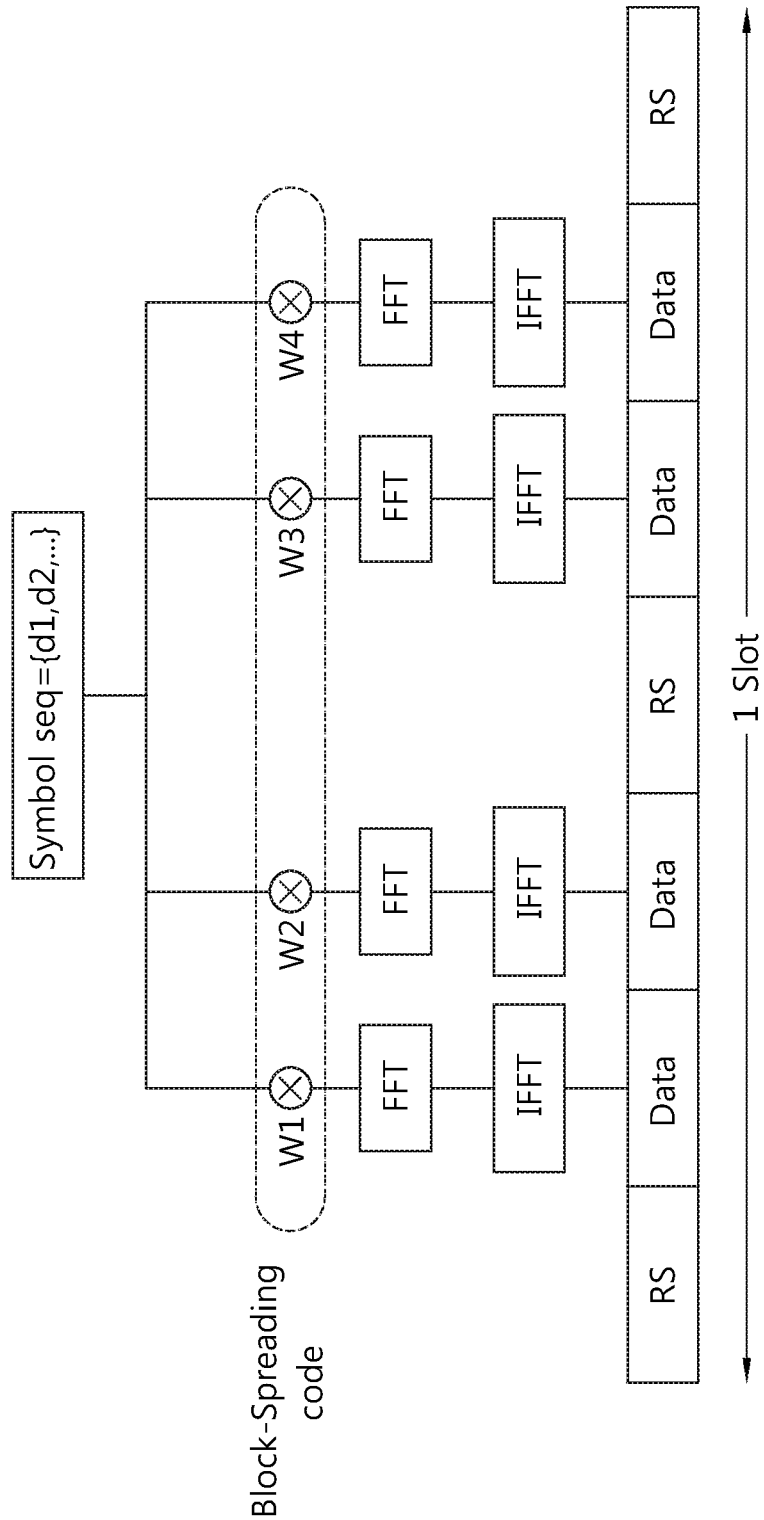
FIG. 8 illustrates a channel structure of a PUCCH format 3.

FIG. 8 illustrates a channel structure of a PUCCH format 3.

Referring to FIG. 8, a block spreading code is applied to a modulation symbol sequence {d1, d2, ... } and is spread in a time domain. The block spreading code may include an orthogonal cover code (OCC). In this case, in the modulation symbol sequence, ACK/NACK information bits are channel-coded (using RM code, TBCC, punctured RM code) so that ACK/NACK coded bits are generated, the ACK/NACK coded bits are a sequence of modulated (for example, QPSK) symbols. The sequence of the modulation symbols is mapped to data symbols of a slot through FFT (fast Fourier transform) and IFFT (inverse fast Fourier transform) to be transmitted. Although FIG. 8 illustrates that three RS symbols are included in one slot, two RS symbol may exist. In this case, a block spreading code of a length 5 may be used. The PUCCH format 3 may be a PUCCH format in which a plurality of modulation symbols are transmitted by being spread in a time domain by the use of an orthogonal sequence (i.e., a block spreading code). In the PUCCH format 3, 48 bits may be transmitted per subframe after channel coding, and the number of information bits that can be transmitted may be up to 21 bits.

<Semi-Persistent Scheduling: SPS>

In the wireless communication system, the UE receives scheduling information such as DL grant and UL grant through a PDCCH to perform an operation of transmitting the PUSCH. In general, the DL grant and the PDSCH are received in the same subframe. Further, in a case of the FDD, the PUSCH is transmitted after fourth subframes from a subframe receiving the UL grant. An LTE except for the dynamic scheduling provides semi-persistent scheduling (SPS).

Downlink or uplink SPS may report by which subframe semi-static transmission (PUSCH)/reception (PDSCH) is performed to the UE through a higher layer signal. For example, a parameter give as the higher layer signal may be a period and an offset value of the subframe.

The UE recognizes SPS transmission/reception through RRC signaling. If receiving activation and release signal of SPS transmission through the PDCCH, the UE performs or releases SPS transmission/reception. That is, although an SPS is allocated through RRC signaling, when SPS transmission/reception are not performed but the activation or release signal is received through the PDCCH, frequency resource (resource block) according to a resource block allocation designated in the PDCCH and modulation and a coding rate according to MCS information are applied so that SPS transmission/reception are performed in a subframe corresponding to a subframe period and an offset value allocated through RRC signaling. If an SPS release signal is received through the PDSSH, SPS transmission/reception stop. If a PDCCH (SPS reactivation PDCCH) including an SPS activation signal is again received, the stopped SPS transmission/reception restarts using a frequency resource and an MCS designated by a corresponding PDCCH.

Hereinafter, a PDCCH for SPS activation refers to an SPS activation PDCCH, and a PDCCH for SPS release refers to an SPS release PDCCH. The UE may validate whether the PDCCH is SPS activation/release PDCCH when following conditions are satisfied. 1. CRC parity bits obtained from a PDCCH payload are scrambled to SPS C-RNTI, and 2. A value of new data indicator field should be '0'. Further, if each filed value included in the PDCCH is set as values of a following table, the UE recognizes that downlink control information (DCI) of a corresponding PDCCH is SPS activation or release.

TABLE 5

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

The table 5 indicates a filed value of an SPS activation PDCCH to validate SPS activation.

TABLE 6

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

The table 6 indicates a field value of an SPS release PDCCH to validate the SPS release.

According to the SPS, a PDSCH transmitted in the same subframe as a PDCCH indicating an SPS activation has a corresponding PDCCH (that is, a PDCCH indicating SPS activation). However, a next PDSCH, that is, a PDSCH scheduled at a later time by using the SPS (called an SPS PDSCH) does not have a corresponding PDCCH. Accordingly, when transmitting ACK/NACK with respect to the SPS PDSCH, it is impossible to use a PUCCH resource mapped to the lowest CCE index of the PDCCH.

Accordingly, for the SPS, a BS may pre-set a plurality of resources through a higher layer signal like an RRC message, and thereafter may indicate an ACK/NACK transmission resource for an SPS PDSCH in such a manner that a specific resource is indicated among the plurality of resources by using a TPC field included in a PDCCH indicating SPS activation. Although the TPC field is originally used to control uplink transmission power, it is alternatively used in this case to indicate the ACK/NACK transmission resource. If a field for indicating the ACK/NACK transmission resource is referred to as an ACK/NACK resource indicator (ARI), the TPC field is alternatively used as an ARI field in the above case. That is, instead of additionally generating the ARI field to indicate the ACK/NACK transmission resource, the existing TPC field is used for this purpose in an alternative/dedicated manner.

Without being limited to the SPS, the ACK/NACK transmission resource determined in this manner may be referred to as an explicit PUCCH resource.

<HARQ (Hybrid Automatic Repeat Request)>

Upon transmission/reception of data between the base station and the UE, when the frame is not received or damaged, an error control method includes an ARQ (Automatic Repeat request) scheme and a HARQ (hybrid ARQ) scheme which is a developed scheme thereof. In the ARG scheme, after one frame is transmitted, a confirmation message ACK is waited for. Only when a reception side exactly receives the frame, the reception side sends the confirmation message ACK. When an error occurs in the frame, the reception side sends a NACK (negative-ACK) message, and a reception frame with the error removes the information in a receiving end buffer. When the transmission side receives the ACK signal, the transmission side transmits a next frame. When receive the NACK message, the transmission side retransmits the frame.

Unlike the ARG scheme, according to the HARQ scheme, when the received frame cannot be demodulated, a receiving end transmits an NACK message to the transmitting end. However, when the received frame is stored in the buffer for a predetermined time so that the frame is retransmitted, the frame is coupled with the received frame so that a reception success rate is increased.

In recent years, more efficient HARQ scheme than the ARQ scheme may be widely used. There are various types of HARQ schemes. The HARQ scheme may be divided into synchronous HARQ and asynchronous HARQ according to retransmission timing. The HARQ scheme may be divided into a channel-adaptive scheme and a channel-non-adaptive scheme according to presence of reflection of a channel state with respect to an amount of a resource used upon retransmission.

Figure 9:
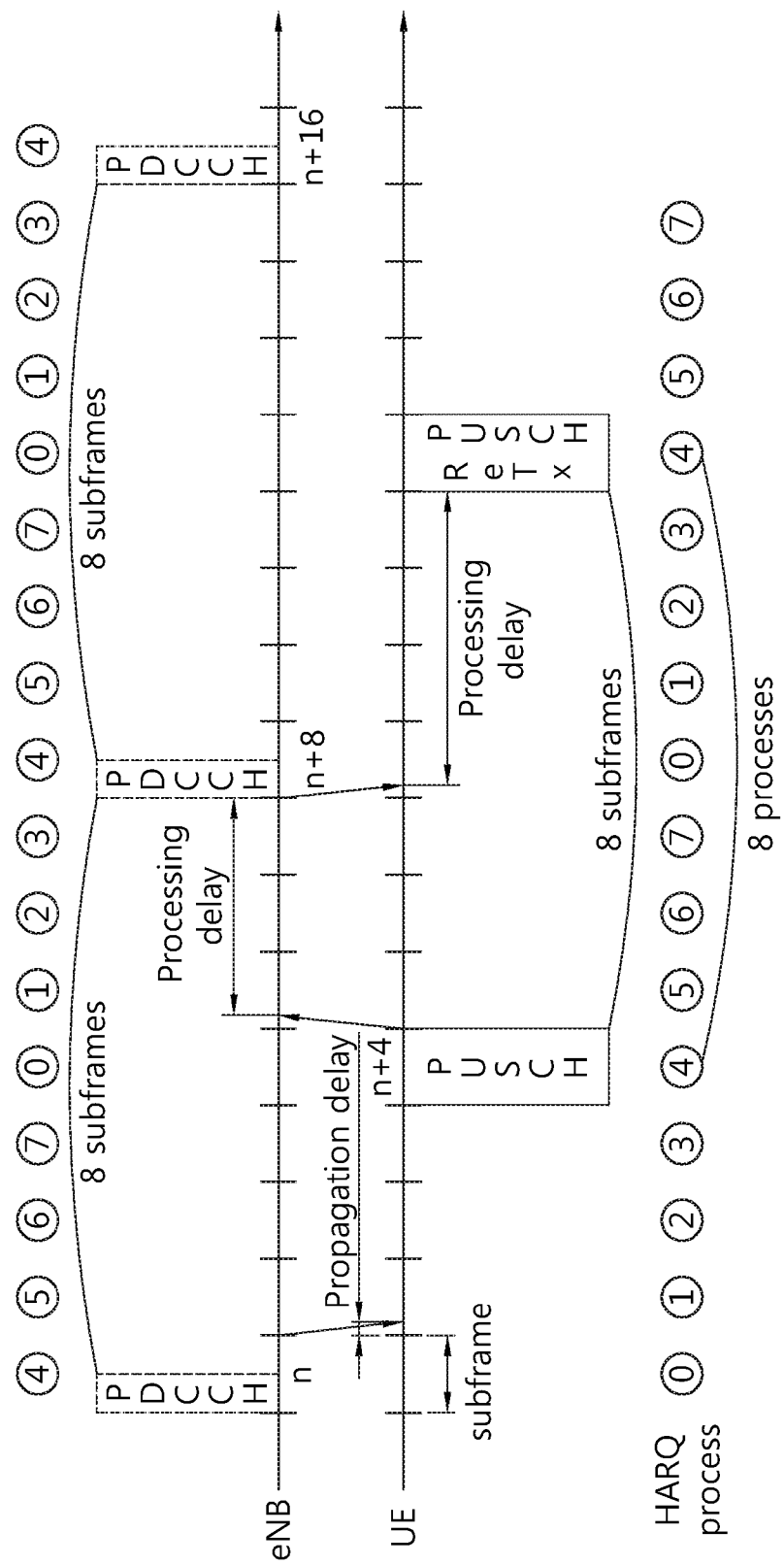
FIG. 9 illustrates a synchronization HARQ.

FIG. 9 illustrates a synchronization HARQ.

The synchronization HARQ is a scheme where next retransmission is achieved at preset timing by a system. That is, if it is assumed that the time of the retransmission is achieved an 8-th time unit after initial transmission, since the engagement is achieved between the base station and the UE, it is not necessary to additionally report the timing. However, if the data transmission side receives an NACK message, data are transmitted in every 8-th time unit in order to receive the ACK message.

Meanwhile, retransmission timing of the asynchronization HARQ scheme is newly scheduled or the asynchronization HARQ scheme may be achieved through additional signaling. Retransmission timing with respect to data in which transmission previously fails is changed due to various factors such as a channel state.

A channel non-adaptive HARQ scheme is a scheme where modulation of data, the number of resource blocks, and a coding scheme upon retransmission are achieved in an order determined in initial transmission. Meanwhile, in the channel adaptive HARQ scheme is a scheme where the modulation of data, the number of resource blocks, and a coding scheme are changed according to a state of the channel.

For example, the transmission side transmits data using 6 resource blocks upon initial transmission. Next, a scheme of equally retransmitting the data using 6 resource blocks is a channel non-adaptive HARQ scheme.

Meanwhile, a scheme of retransmitting data using resource blocks greater or less than 6 according to a channel state although the data are initially transmitted using 6 resource blocks is a channel adaptive HARQ scheme.

Four types of HARQs may be combined through the above classification. A widely used HARQ scheme includes asynchronization and channel adaptive HARQ scheme and synchronization and channel non-adpative HARQ scheme. Since the asynchronization and channel adaptive HARQ scheme may maximize retransmission efficiency by adaptively changing retransmission timing and an amount of a resource but overhead is increased, the asynchronization and channel adaptive HARQ scheme is not generally considered for uplink. Meanwhile, since the synchronization and channel adaptive HARQ does not substantially have overhead because timing and resource allocation for retransmission are engaged in the system, overhead is rare, but retransmission efficiency is very lower in a channel state having great variation.

In downlink in a current 3GPP LTE, the asynchronization HARQ scheme is used. In uplink case, the synchronization HARQ scheme is used.

Meanwhile, as an example of the downlink, until the data is scheduled and transmitted and then the ACK/NACK signal is received from the user equipment and the next data is transmitted again, a time delay occurs as illustrated in FIG. 9. This is a delay which occurs due to a propagation delay of the channel and a time required for data decoding and data coding. A method has been used, which transmits data by using an independent HARQ process, in order to prevent a gap of data transmission from being risen during a delay interval.

For example, when a shortest period from the data transmission to the next data transmission in one HARQ process is eight subframes, the data may be transmitted without the blank by providing eight independent HARQ processes. In LTE FDD, in the case of not operating in the MIMO, a maximum of eight HARQ processes may be assigned.

<Carrier Aggregation>

Hereinafter, the carrier aggregation system will be described.

Figure 10:
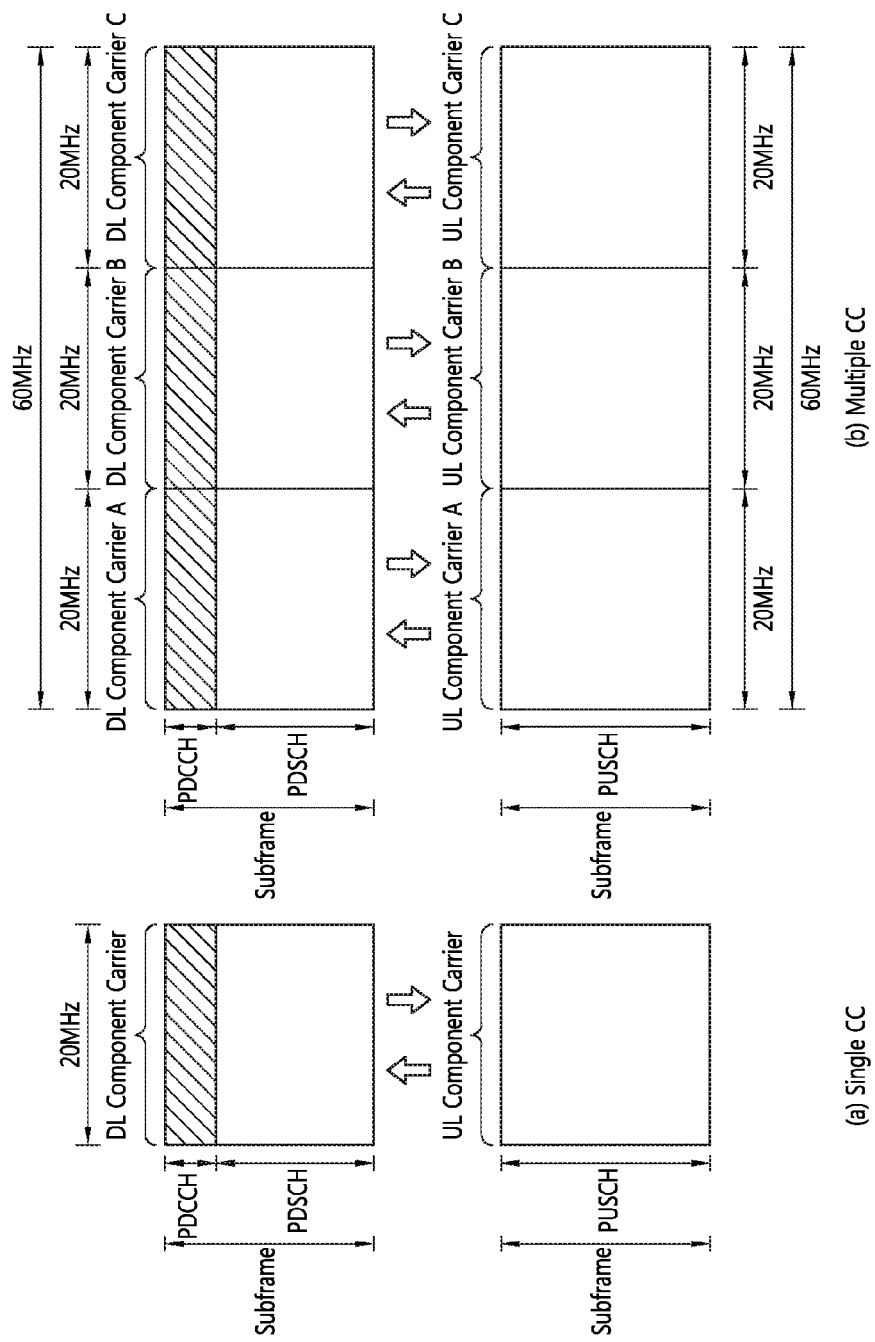
FIG. 10 illustrates an example of comparing an existing single carrier system and a carrier aggregation system.

FIG. 10 illustrates an example of comparing an existing single carrier system and a carrier aggregation system.

Referring to FIG. 10, in a single carrier system, only one carrier is supported to the UE in uplink and downlink. Although there may be various bandwidths of the carrier, one carrier is allocated to the UE. Meanwhile, in the CA system, a plurality of component carriers (DL CC A to C, UL CC A to C). The component carrier (CC) means a carrier used for the CA system and may refer to a carrier. For example, in order to allocate a bandwidth of 60 MHz to the UE, 3 component carriers of 20 MHz may be allocated.

The CA system may be classified into a continuous CA system where aggregated carriers continue and a non-continuous CA system where the aggregated carriers are spaced apart from each other. Hereinafter, it is understood that the CA system includes all of a case of a continuous component carrier and a case of a non-continuous component carrier.

A system frequency band of the wireless communication system is classified into a plurality of carrier-frequencies. The carrier frequency means a center frequency of a cell. Hereinafter, the cell may mean a downlink frequency resource and an uplink frequency resource. Alternatively, the cell may mean a combination of the downlink frequency resource and an optional uplink frequency resource. Further, generally, when the CA is not considered, one cell may include a pair of uplink and downlink frequency resources.

In order to transmit/receive packet data through the specific cell, the UE should finish configuration with specific cell. In this case, the configuration means a state of finishing reception of system information necessary to transmit/receive data with respect to a corresponding cell. For example, the configuration may include the whole procedure to receive common physical layer parameters necessary to transmit/receive data, or MAC (media access control) layer parameters, or parameters necessary for a specific operation at an RRC layer. If a cell in which the configuration is terminated receives only information indicating that packet data may be transmitted, the cell may transmit and receive a packet at once.

The cell in which the configuration is terminated may be in an activation state or a deactivation state. In this case, the activation means that data are transmitted or received or transmission or reception of the data in a ready state. The UE may monitor or receive a control channel PDCCH and a data channel PDSCH of an activated cell in order to confirm resources (frequency, time, or the like) allocated to the UE.

The deactivation means that transmission or reception of traffic data is impossible and measurement or transmission/reception of minimum information is possible. The UE may receive system information SI necessary to receive a packet from a deactivated cell. Meanwhile, the UE does not monitor or receive a control channel PDCCH and a data channel PDSCH of the deactivated cell in order to confirm resources (frequency, time, or the like).

The cell may be classified into a primary cell, a secondary cell, and a serving cell.

The primary cell means a cell operating at a primary frequency, and means a cell performing initial connection establishment procedure or connection reestablishment procedure with the base station or a cell indicated as a primary cell at a handover procedure.

The secondary cell means a cell operating in a secondary cell. If RRC connection is established, the secondary cell is used to provide an additional preset wireless resource.

In a case of UE in which the CA is not set or does not provide the CA, the serving cell is configured by the primary cell. When the carrier aggregation is set, the term 'serving cell' represents a cell set to the UE and a plurality of serving cell may be configured. One serving cell may be configured by one downlink component carrier or a pair of {downlink component carrier, uplink component carrier}. A plurality of serving cells may be configured by a primary cell and one secondary cell or a plurality of secondary cells.

A PCC (primary component carrier) signifies a component carrier (CC) corresponding to a primary cell. The PCC is a CC where the UE initially achieves connection or RRC connection with the base station among a plurality of CCs. The PCC is a special CC to provide connection or RRC connection for signaling regarding a plurality of CC, and to manage UE context which is connection information associated with the UE. Further, when the PCC accesses the UE in an RRC connection mode, the PCC is always in an active state. A downlink component carrier corresponding to the primary cell refers to a DownLink Primary Component Carrier (DL PCC) and an uplink component carrier corresponding to the primary cell refers to an uplink primary component carrier (UL PCC).

The SCC (secondary component carrier) means a CC corresponding to the secondary cell. That is, the SCC is a CC allocated to the UE except for a PCC. The SCC is an extended carrier when the UE selects for additional resource allocation except for the PCC, and may be divided into a activation state or a deactivation state. A downlink component carrier corresponding to the secondary cell refers to a DownLink secondary Component Carrier (DL SCC) and an uplink component carrier corresponding to the second cell refers to an uplink secondary component carrier (UL SCC).

The primary cell and the secondary cell have following characteristics.

First, the primary cell is used to transmit the PUCCH. Second, the primary cell is always activated, but the second cell is a carrier which is activated/deactivated according to a specific condition. Third, when the primary cell experiences a Radio Link Failure (hereinafter referred to as 'RLF'). Fourth, the primary cell may be changed according to variation in a security key, a RACH (Random Access CHannel) procedure, and an accompanying handover procedure. Fifth, NAS (non-access stratum) information is received through the primary cell. Sixth, in a case of an FDD system, the primary cell always configures a pair of the DL PCC and the UL PCC. Seventh, different component carriers CCs may be set as the primary cell every UE. Eighth, the primary cell may be replaced by only handover, cell selection/cell reselection procedures. In addition of a new secondary cell, RRC signal may be used to transmit system information of a dedicated secondary cell.

In a component carrier configuring the serving cell, the downlink component carrier may configure one serving cell, or the downlink component carrier and the uplink component carrier are connected and configured so that one serving cell may be configured. However, the serving cell may not be configured by only one uplink component carrier.

Activation/deactivation of the component carrier is similar to concept of activation/deactivation of the serving cell. For example, activation of the serving cell 1 means activation of the DL CC1 on the assumption that the serving cell 1 is configured by a DL CC1. If the activation of the serving cell 2 means activation of a DL CC2 and the UL CC2 on the assumption that the serving cell 2 is configured by connecting and configuring a DL CC2 and a UL CC2. In this meaning, each component carrier may correspond to a serving cell.

The number of component carriers aggregated between downlink and uplink may be differently set. When the number of CCs in the downlink is the same as the number of CCs in the uplink, the aggregation is symmetric. When the number of CCs in the downlink is different from the number of CCs in the uplink, the aggregation is asymmetric. Further, the sizes (that is, bandwidths) of the CCs may be different from each other. For example, when five CCs is used to configure 70 MHz band, 5 MHz CC(carrier #0)+20 MHz CC(carrier #1)+20 MHz CC(carrier #2)+20 MHz CC(carrier #3)+5 MHz CC(carrier #4) may be configured.

As described above, the CA system may support a plurality of CCs, that is, a plurality of serving cells unlike the single carrier system.

Such a CA system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carrier except for a component carrier fundamentally linked with the specific component carrier. That is, the PDCCH and the PDSCH may be transmitted through different DL CCs, a PUSCH may be transmitted through a UL CC different from a UL CC liked with a DL CC to which a PDCCH including an UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

A CA system to support the cross-carrier scheduling may include a carrier indicator field (CIF) included in a DCI (downlink control information) format according to the related art. In the system to support the cross-carrier scheduling, for example, an LTE-A system, since a CIF is added to an existing DCI format (that is, a DCI format used in an LTE), 3 bits may be spread, and a PDCCH structure may reuse an existing coding method, a resource allocation method (that is, a CCE based resource mapping).

The base station may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the base station transmits a PDCCH with respect to PDSCH/PUSCH to be scheduled through only the DL CCs included in the PDCCH monitoring DL CC group. The PDCCH monitoring DL CC group may be configured to UE-specific, UE group-specific, or cell-specific.

As oppose to cross carrier scheduling, a method in which a PDSCH scheduled by the PDCCH is transmitted in the same carrier may be referred to as non-cross carrier scheduling or self-scheduling.

<ACK/NACK Transmission Method in HARQ Process>

Hereinafter, ACK/NACK transmission for HARQ in 3GPP LTE will be described.

In FDD, a user equipment for supporting aggregation for a maximum of two serving cells transmits ACK/NACK by using PUCCH format 1b with channel selection when two serving cells are configured.

The user equipment for supporting aggregation of two or more serving cells transmits the ACK/NACK by using the PUCCH format 1b or the PUCCH format 3 with the channel selection according to configuration of a higher-layer signal when two or more serving cells are configured. The PUCCH format 1b with the channel selection will be described below.

In TDD, the DL subframe and the UL subframe coexist in one radio frame unlike the frequency division duplex (FDD). In general, the number of UL subframes is smaller than the number of DL subframes. Accordingly, against insufficient UL subframes for transmitting the ACK/NACK signal, it is supported that a plurality of ACK/NACK signals for downlink data (that is, a plurality of PDSCHs) received in the plurality of DL subframes is transmitted in one UL subframe.

In the TDD, a user equipment that does not support the aggregation of two or more serving cells two ACK/NACK modes of bundling and channel selection are supported according to a configuration of a higher layer.

First, the bundling transmits ACK when the UE succeeds all decoding of a received PDSCH (that is, downlink transmission blocks) and transmits NACK in remaining cases. This refers to an AND operation. However, the bundling is not limited to the AND operation but may include various operations to compress ACK/NACK bits corresponding to a plurality of transmission blocks (or code-words). For example, the bundling may indicate a value counting the number of ACKs (or NACKs) or the number of continuous ACKs.

Second, the channel selection refers to ACK/NACK multiplexing. In the channel selection, the UE selects one from a plurality of PUCCH resources to transmit ACK/NACK to the selected PUCCH resource.

A following table is an example of a DL subframe n−k associated with an UL subframe n according to UL-DL configuration in the 3GPP LTE. In this case, k□K, and the M represents the number of components of a group K.

TABLE 7

| UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

M=3 is considered on the assumption that M DL subframes are connected to a UL subframe n. Three PDCCHs may be received from three DL subframes, and the UE may acquire 3 PUCCH resources ($n^{(1)}_{PUCCH,0}$, $n^{(1)}_{PUCCH,1}$, $n^{(1)}_{PUCCH,2}$). An example of the channel selection in the TDD is as follows.

TABLE 8

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the table 8, HARQ-ACK(i) represents ACK/NACK with respect to an i-th downlink subframe among M downlink subframes. DTX (DTX (Discontinuous Transmission) means that a DL transmission block is not received on a PDSCH in a corresponding DL subframe or a corresponding PDCCH is not detected. According to the above table 8, there are 3 PUCCH resources ($n^{(1)}_{PUCCH,0}$, $n^{(1)}_{PUCCH,1}$, $n^{(1)}_{PUCCH,2}$), and b(0) and b(1) are two bits transmitted using a selected PUCCH.

For example, if the UE successively receives all of the three DL transmission blocks in three DL subframes, the UE QPSK-modulate a bit (1,1) using $n^{(1)}_{PUCCH,2}$ to transmit the modulated bit. If the UE fails decoding of a DL transmission block in a first (i=0) DL subframe and succeeds decoding of DL transmission blocks in remaining subframes, the UE transmits a bit (1,0) on the PUCCH using $n^{(1)}_{PUCCH,2}$.

In the channel selection, if there is at least one ACK, NACK is coupled with DTX. This is because all ACK/NACK states may be expressed by a combination of a reserved PUCCH resource and a QPSK symbol. However, there is no ACK, the DTX is coupled from the NACK.

An existing PUCCH format 1b may transmit only ACK/NACK having 2 bits. However, the PUCCH format 1b using the channel selection represents more ACK/NACK states by linking a combination of allocated PUCCH resources and a modulation symbol (2 bits) to a state of a plurality of ACK/NACK.

Meanwhile, when it is assumed that M DL subframes are connected to UL subframe n, ACK/NACK mismatch between the base station and the user equipment may occur due to missing of the DL subframe (alternatively, PDCCH).

It is assumed that M=3 and the base station transmits three DL transmission blocks through the DL subframe. Since the user equipment may not detect the PDCCH in a second DL subframe, the user equipment may not receive a second transmission block at all and may receive only remaining first and third transmission blocks. In this case, when the ACK/NACK bundling is used, an error in which the user equipment transmits the ACK occurs.

A downlink assignment index (DAI) is included in a DL grant on the PDCCH in order to resolve the error. The DAI indicates the number of accumulated PDCCHs that transmit the assigned PDSCH. A 2-bit DAI value sequentially increases from 1 to be applied with a modulo-4 calculation again from DAI=4. For example, when M=5 and five DL subframes are all scheduled, DAI=1, 2, 3, 4, and 1 may be included in PDCCHs corresponding thereto in the order thereof.

In the TDD, when UL-DL configuration is 5 and the user equipment does not support the aggregation of two or more serving cells, only the bundling is supported.

In the TDD, in the case of the user equipment supporting the aggregation of two or more serving cells, when two or more serving cells are configured, the user equipment transmits the ACK/NACK by using one of the PUCCH format 1b with channel selection or the PUCCH format 3 according to the higher layer configuration.

In the TDD, the user equipment supporting the aggregation of two or more serving cells is configured by the higher layer signal so as to use the bundling and transmits the ACK/NACK by using one of the PUCCH format 1b with channel selection or the PUCCH format 3 according to the upper layer configuration even when one serving cell is configured.

When the ACK/NACK for two or more serving cells is transmitted through the PUCCH format 1b with the channel selection, a mapping table between HARQ-ACK(i) and (PUCCH resource and transmission bit) may be defined as a table given below according to the number (referred to as A) of PUCCH resources used for the channel selection.

TABLE 9

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

TABLE 10

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

TABLE 11

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Table 9 shows a case at A=2, Table 11 shows a case at A=3, and Table 11 shows a case at A=4.

Even in the FDD, a table similar to Tables 9 to 11 is defined and the ACK/NACK may be transmitted according to the table.

<ACK/NACK Transmission Process of UE when PUCCH Format 3 is Configured in Conventional TDD>

In a DL subframe (e.g., a subframe n−k, k∈K, K is defied in Table 7 above and denotes a set consisting of M elements, i.e., $\{k_0, k_1, \ldots, k_{M-1}\}$) associated with a UL subframe (e.g., a subframe n) for transmitting ACK/NACK, in a case where: i) one PDSCH scheduled without a PDCCH is present only in a PCC and a PDCCH requiring an ACK/NACK response is not present; ii) one PDSCH scheduled with a PDCCH is present only in a PCC and the PDSCH has DAI=1, or iii) one PDCCH having DAI=1 and requiring an ACK/NACK response (e.g., a downlink SPS release PDCCH, hereinafter, the same is applied) is present and a PDSCH is not present, the UE transmits ACK/NACK by using the PUCCH format 1a/1b in the UL subframe.

iv) When a PDCCH having DAI=1 and requiring an ACK/NACK response is present or one PDSCH scheduled with the PDCCH is present only in a PCC or when one PDSCH scheduled without the PDCCH is present, the UE uses a channel selection by using the PUCCH format 1a/1b in the UL subframe.

In this case, first ACK/NACK (HARQ-ACK) corresponds to a PDSCH transmitted without a PDCCH, second HARQ-ACK corresponds to a first codeword of a PDSCH scheduled by a PDCCH having DAI=1 or a downlink SPS release PDCCH, and third HARQ-ACK corresponds to a second codeword of a PDSCH scheduled by a PDCCH having DAI=1.

It may be determined such that the PUCCH format 1a/1b or the channel selecting using the PUCCH format 1a/1b are applied when an ARI for resource selection of the PUCCH format 3 cannot be received from the PDCCH. In TDD, the above conditions i) to iv) may be referred to as single ACK/NACK (sA/N). Unlike the conditions i) to iii), the condition iv) may operate in an exceptional manner (even if an SR and a CSI collide).

v) ACK/NACK transmitted in a case other than the above cases i) to iv) may be referred to as multiple ACK/NACK (mA/N). For example, ACK/NACK transmitted when ARI for resource selection of the PUCCH format 3 can be received from the PDCCH may be referred to as mA/N.

Meanwhile, in TDD, if the PUCCH format 3 is configured for ACK/NACK transmission and if two or more serving cells are configured, and the number M of DL subframes mapped to a subframe n is greater than 1, then the UE may transmit ACK/NACK by using a PUCCH format 3 resource $n^{(3,\tilde{p})}_{PUCCH}$ or a PUCCH format 1 resource $n^{(1,\tilde{p})}_{PUCCH}$ in the subframe n. p' is a value mapped to an antenna port p.

For convenience of explanation, the UE may operate as follows under the assumption that there is no PDSCH which is not directly scheduled by a PDCCH/E-PDCCH (e.g., a PDSCH scheduled semi-statically without the PDCCH/E-PDCCH).

In a primary cell, in a case where: 1) only one PDSCH indicated by detecting a corresponding PDCCH (DAI=1) is received in a subframe n−$k_m$($k_m$∈K); or 2) a PDCCH (DAI=1) indicating a downlink SPS release is received in a subframe n−$k_m$($k_m$∈K), the UE uses the PUCCH format 1a/1b. In this case, the PUCCH format 1 resource is used.

The PUCCH format 1 resource may be a resource mapped to an index of a first CCE used for transmission of a corresponding PDCCH received in the subframe n−$k_m$ ($k_m \in K$). That is, in this case, the PUCCH format 1 resource may not be explicitly given, and may be implicitly given according to a lowest CCE index used for transmission of a corresponding PDCCH. Hereinafter, such a PUCCH format 1 resource is referred to as an implicit PUCCH format 1 resource.

Meanwhile, there may be a case where only one PDSCH is transmitted in the primary cell while a corresponding PDCCH is not present in a subframe n−k(k∈K) and a downlink SPS release PUCCH is not present either. Such a case may occur in a subframe located later than a subframe in which a downlink SPS activation PDCCH is transmitted when a downlink SPS is configured. In this case, the UE uses the PUCCH format 1a/1b for ACK/NACK transmission. Herein, a PUCCH resource is selected from one of explicit resources configured by a higher layer by using a TPC field included in the downlink SPS activation PDCCH. That is, the TPC field plays a role of indicating one PUCCH resource used for ACK/NACK transmission among a plurality of explicit resources. In this sense, it is expressed that the TPC field is alternatively used as an ACK/NACK resource indicator (ARI).

Meanwhile, in a case where: M>1; a PDSCH is transmitted only in the primary cell and a corresponding PDCCH is not detected in a subframe n−k(k∈K) of the primary cell; and a PDSCH which detects a PDCCH with DAI=1 is transmitted in the subframe n−$k_m$($k_m \in K$) or a downlink SPS release PDCCH (DAI=1) is detected in a subframe n−$k_m$($k_m \in K$), the UE transmits ACK/NACK by using the PUCCH format 1b in the subframe n. In this case, one of 2 or 3 resources is selected as PUCCH resources. If the UE is configured to a transmission mode supporting up to 2 transport blocks in the primary cell, one of 3 resources is selected, and otherwise, one of 2 resources is selected.

Meanwhile, in a case where: M>1; and a PDSCH is transmitted only in the primary cell and a corresponding PDCCH (DAI>1) is detected in a subframe n−$k_m$($k_m \in K$) of the primary cell or a downlink SPS release PDCCH (DAI>1) is detected in a subframe n−$k_m$($k_m \in K$), the UE transmits ACK/NACK by using the PUCCH format 3 in the subframe n. In this case, one of four resources configured by a higher layer is selected as the PUCCH resource according to a TPC field value of the PDCCH with DAI>1. That is, a TPC field of a PDCCH for scheduling the primary cell with DAI>1 is alternatively used as an ARI.

Meanwhile, also in a case where a PDSCH is transmitted in a secondary cell indicated by detecting a corresponding PDCCH in a subframe n−k(k∈K), the UE may transmit ACK/NACK by using the PUCCH format 3. In this case, as a PUCCH resource, one resource is selected from four resources configured by a higher layer according to a TPC field of the PDCCH. If a PDCCH corresponding to a PDSCH transmitted in the primary cell is detected in the subframe n−k(k∈K) or a downlink SPS release PDCCH is detected in the subframe n−k(k∈K), a TPC field included in a PDCCH with DAI>1 is used to select one of four resources configured by a higher layer.

The present invention will now be described.

MTC (machine type communication), MU-MIMO (multi-user multi-input multi-output), and CA between TDD cells using different UL-DL configurations may be used in a next generation wireless communication system. Further, the number of simultaneously scheduled UEs may be increased.

Accordingly, a control channel to schedule an existing data channel may be insufficient. In order to solve a resource insufficient phenomenon of a PDCCH being a control channel in a 3GPP LTE, bundled scheduling to schedule a plurality of PDSCHs transmitted through a plurality of subframes or a plurality of cells through one PDCCH is considered or cross-subframe scheduling is considered to flexibly use the PDCCH. The cross-subframe scheduling is to transmit the PDSCH by a PDCCH scheduling the PDSCH from a subframe different from a subframe transmitted from the PDSCH. Meanwhile, introduction of an E-PDCCH (enhanced-PDCCH) except for an existing PDCCH is considered.

<E-PDCCH>

Figure 11:
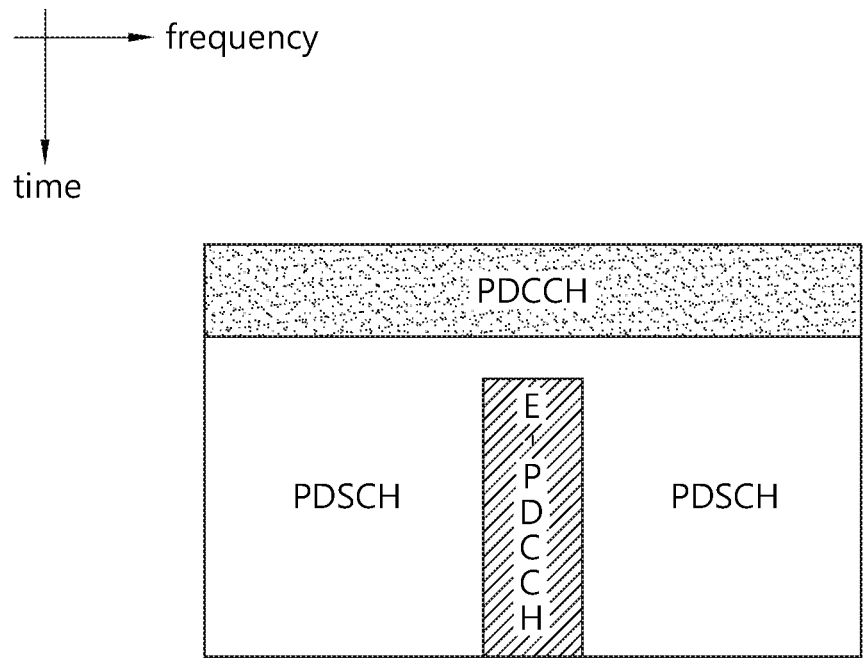
FIG. 11 illustrates an example of E-PDCCH assignment.

FIG. 11 illustrates an example of E-PDCCH assignment.

In LTE-A, assigning and using the E-PDCCH which is a new control channel in the data area has been considered. The E-PDCCH as a control channel configured in the data area in which the PDSCH is transmitted may be a control channel that performs demodulation by using a UE-specific reference signal. That is, the E-PDCCH is clearly distinguished from the assigned area, that is, the PDCCH which is the existing control channel in the reference signal used for the demodulation.

The E-PDCCH may also configure an enhanced-CCE (e-CCE) similarly to the PDCCH and apply implicit PUCCH resource mapping based on the -configured E-CCE. The E-CCE is a configuration unit configuring the E-PDCCH. The quantity of resources included in the E-CCE may be the same as or different from each other the quantity of resources included in a CCE configuring the PDCCH.

<Field Configuration of DCI Transmitted Through E-PDCCH>

First, a method of configuring and using an ARI field in LTE-A RELEASE 10 (hereinafter, REL-10) is described. As described above, the ARI field implies a field used to indicate one of a plurality of PUCCH resources configured by a higher layer.

In case of FDD, a TPC field of a PDCCH for scheduling a PDSCH of a secondary cell is used alternatively as an ARI. On the other hand, a TPC field of a PDCCH for scheduling a PDSCH of the primary cell or a PDCCH requiring an ACK/NACK response is used for its original use, i.e., for power control.

In case of TDD, the method of configuring and using the ARI varies depending on whether a PUCCH format 3 is configured for ACK/NACK transmission or a channel selection is configured by using a PUCCH format 1b.

First, in a case where the PUCCH format 3 is configured, a TPC field of the remaining PDCCHs other than a PDCCH of which DAI has an initial value (e.g., 1) and which schedules a PDSCH of a primary cell or a PDCCH which requires an ACK/NACK response (a TPC field of such PDCCHs is used for its original use, i.e., for power control) may be alternatively used as the ARI.

In a case where the channel selection using the PUCCH format 1b is configured, if a PDCCH which schedules a PDSCH of the secondary cell is present in the secondary cell, that is, if the PDCCH is present in the secondary cell in self-scheduling, a TPC field of the PDCCH is alternatively used as the ARI.

In a case where the PUCCH format 3 is configured, if the TPC field is alternatively used as the ARI, the TPC field is used to select one of a plurality of PUCCH format 3 resources explicitly allocated by using a higher layer signal (i.e., RRC). As such, if the PUCCH format 3 is configured for an ACK/NACK response, four explicit PUCCH resources (or indices indicating such resources) are indicated sequentially according to a first RRC field, a second RRC field, a third RRC field, and a fourth RRC field. The ARI is a value indicating a specific field among the four RRC fields.

In this sense, the ARI can be seen as an offset value regarding which RRC field will be used.

In a case where the channel selection using the PUCCH format 1b is selected, if the TCP field is alternatively used as the ARI, the TPC field is used to select one of a plurality of PUCCH format 1b resources allocated explicitly by using a higher layer signal (i.e., RRC).

According to the present invention, a DCI for downlink scheduling (hereinafter, DL DCI) and transmitted in an E-PDCCH is added with an additional field in addition to the TPC field. The DL DCI may correspond to the remaining DCI formats other than DCI formats 0 and 4. The additional field to be added is a field which is not present in the DL DCI transmitted through the PDCCH. The additional field to be added may be used to transmit an offset value for selecting a resource for ACK/NACK transmission of the PUCCH format 1a/1b in response to a PDSCH scheduled with an E-PDCCH. In particular, the offset value is originally used as an offset not for an explicit resource but for an implicit resource. The implicit resource may be configured such that a PUCCH format 1a/1b resource implicitly corresponding to the PDCCH and a PUCCH format 1a/1b resource implicitly corresponding to the E-PDCCH are present, and respective corresponding resource regions overlap with each other. Accordingly, an offset value is allocated to avoid a collision of such a resource. On the other hand, since the explicit resource is a resource uniquely allocated to a UE other than a resource corresponding to the PDCCH or the E-PDCCH, there is no need to allocate an offset value for avoiding an additional resource collision other than an ARI (i.e., an RRC field selection). Therefore, in the present invention, the additional field to be added may be not only used for its original use, i.e., for an offset value for an implicit resource, but also optionally used for the ARI. This is described below in greater detail.

Hereinafter, the additional field to be added is simply referred to as an additional ARI field or an ACK/NACK resource offset (ARO) field. That is, conventionally, the ARI field is not present in the conventional DL DCI included in the E-PDCCH/PDCCH, and if a specific condition is satisfied, the TPC field is alternatively used as the ARI field, whereas in the present invention, an independent field (referred to as an additional ARI field or an ARO field) independent of the TCP field is added to a DL DCI transmitted through the E-PDCCH. As such, if the additional ARI field or ARO field is added, the TCP field may be used for its original use, i.e., for power control. In this case, an ARI value required in the conventional methods may be transmitted through the ARO field if transmission of an offset value for an implicit resource is unnecessary in the ARO field.

Figure 12:
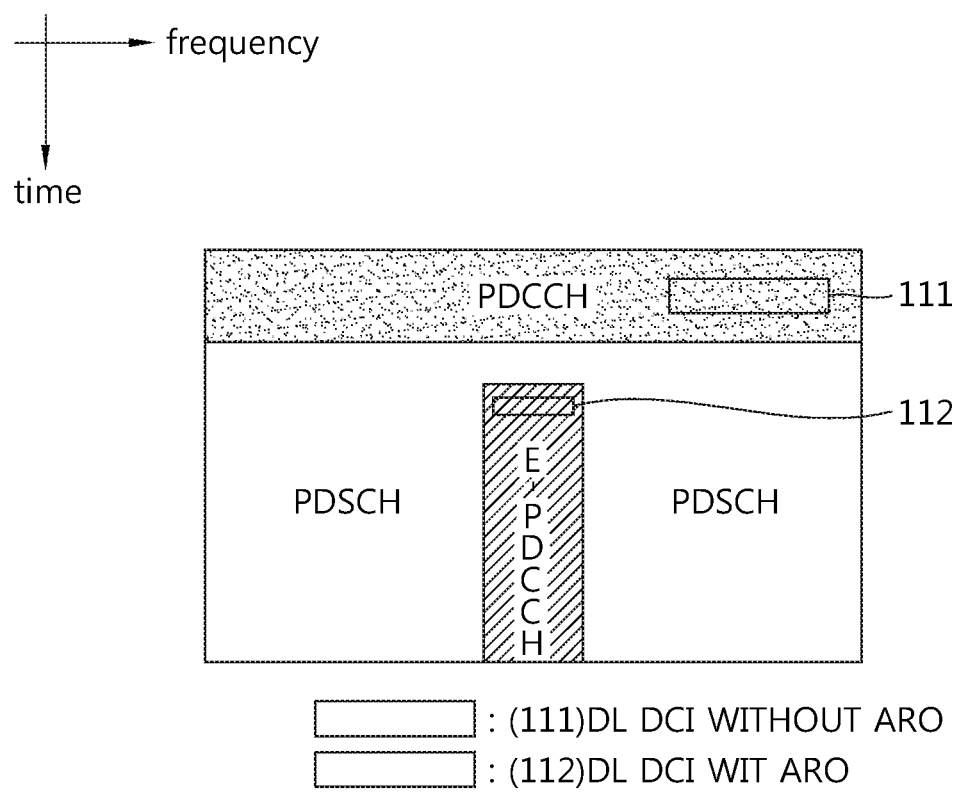
FIG. 12 shows a difference between a DL DCI transmitted through an E-PDCCH and a DL DCI transmitted through a PDCCH.

FIG. 12 shows a difference between a DL DCI transmitted through an E-PDCCH and a DL DCI transmitted through a PDCCH.

Referring to FIG. 12, a DL DCI 111 transmitted through the PDCCH does not include an ARO field. Instead, if one of a plurality of explicit resources needs to be indicated for ACK/NACK transmission, a TPC field may be dedicated for this usage.

Meanwhile, the ARO field is included in a DL DCI 112 (e.g., DCI formats other than DCI formats 0 and 4) transmitted through the E-PDCCH. That is, the ARO field is present only for a case where the DL DCI is transmitted through the E-PDCCH, and is not present when the DL DCI is transmitted through the PDCCH. The ARO field may be 2 bits.

The ARI field may be set to a specific value, for example, 0 (i.e., zero-padding) in a case where: 1) the DL DCI is transmitted through an E-PDCCH of a secondary cell; or 2) the DL DCI is transmitted through an E-PDCH of a primary cell and the DL DCI schedules a PDSCH of the secondary cell and is configured with a PUCCH format 3 to feed back ACK/NACK to a UE.

Meanwhile, the following three cases may be considered according to whether cross carrier scheduling is used or non-cross carrier scheduling (self-scheduling) is used.

1. A case where the primary cell is scheduled in the primary cell. That is, this is a case of scheduling a PDSCH transmitted using the primary cell through a PDCCH/E-PDCCH transmitted in the primary cell.

2. A case where the secondary cell is scheduled in the primary cell. That is, this is a case of scheduling a PDSCH transmitted using the secondary cell through a PDCCH/E-PDCCH transmitted in the primary cell.

3. A case where the secondary cell is scheduled in the secondary cell. That is, this is a case of scheduling a PDSCH transmitted using the secondary cell through the PDCCH/E-PDCCH transmitted in the secondary cell.

Hereinafter, the above cases are referred to as cases 1, 2, and 3.

In addition, for convenience of explanation, it is assumed that there is no PDSCH (e.g., PDSCH scheduled semi-statically without the PDCCH/E-PDCCH) which is not dynamically scheduled directly by the PDCCH/E-PDCCH. That is, a case where only the PDSCH scheduled by direct dynamic scheduling by the PDCCH/E-PDCCH is exemplified. However, the present invention is not limited thereto.

If cross carrier scheduling is not allowed during the above cases 1 to 3, the case 2 does not occur. Self-scheduling may occur only in the cases 1 and 3.

Figure 13:
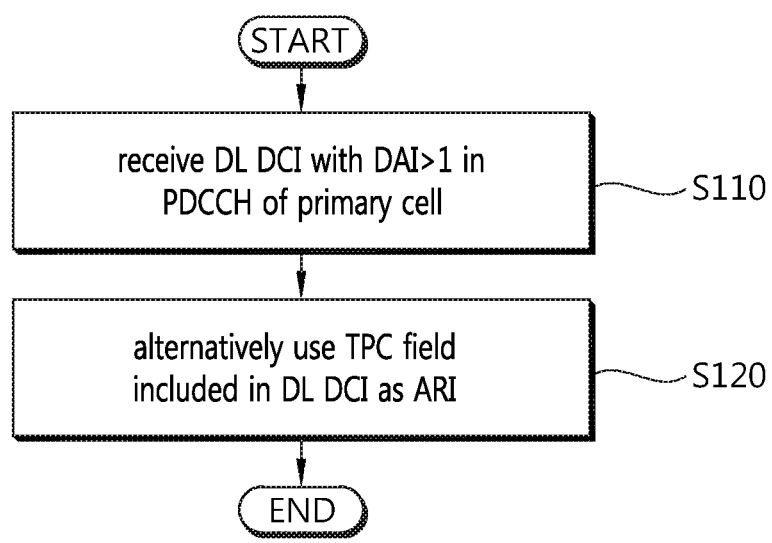
FIG. 13 shows an operation of a UE when a DL DCI of which a DAI is greater than 1 is received among DL DCIs transmitted through a PDCCH in the conventional TDD.

FIG. 13 shows an operation of a UE when a DL DCI of which a DAI is greater than 1 is received among DL DCIs transmitted through a PDCCH in the conventional TDD. It is assumed a case where a PDSCH is transmitted only in a primary cell, a corresponding PDCCH is detected, and M>1. That is, it is assumed that M>1 in the case 1 above.

Referring to FIG. 13, a UE receives a DL DCI with DAI>1 in a PDCCH of the primary cell (step S110). For example, if ACK/NACKs for a PDSCH received in two DL subframes are transmitted in one UL subframe (i.e., M=2), the DL DCI may be included of which a PDCCH of a first DL subframe between the two DL subframes is DAI=1 and a PDCCH of a second DL subframe is DAI=2.

The UE alternatively uses a TPC field included in the DL DCI with DAI>1 as an ARI (step S120). In the above case, the UE transmits ACK/NACK by using a PUCCH format 3. In this case, a PUCCH resource in use is indicated by the TPC field included in the DL DCI with DAI>1. That is, the TPC field is alternatively used as an ARI.

In other words, when a DL DCI with DAI=1 is received in the PDCCH, the UE uses a TPC field included in the DL DCI for its original use, i.e., for uplink transmission power control. In addition, when the DL DCI with DAI>1 is received in the PDCCH, the TPC field included in the DL DCI is alternatively used as the ARI.

Figure 14:
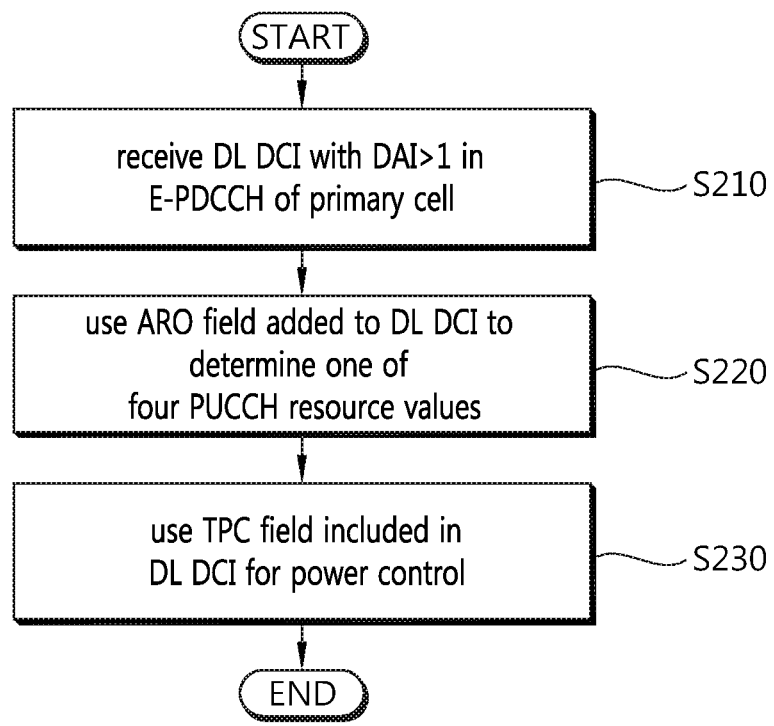
FIG. 14 shows an operation of a UE when a DL DCI of which a DAI is greater than 1 is received among DL DCIs transmitted through an E-PDCCH in TDD.

FIG. 14 shows an operation of a UE when a DL DCI of which a DAI is greater than 1 is received among DL DCIs transmitted through an E-PDCCH in TDD. It is assumed a case where a PDSCH is transmitted only in a primary cell, a corresponding E-PDCCH is detected, and M>1. That is, it is assumed that M>1 in the case 1 above.

Referring to FIG. 14, a UE receives a DL DCI with DAI>1 in an E-PDCCH of the primary cell (step S210). For example, if ACK/NACKs for a PDSCH received in two DL subframes are transmitted in one UL subframe (i.e., M=2), a DL DCI may be included of which an E-PDCCH of a first DL subframe between the two DL subframes is DAI=1 and a PDCCH of a second DL subframe is DAI=2. As described above, the DL DCI transmitted through the E-PDCCH includes an ARO field.

The UE uses an ARO field additionally included in the DL DCI with DAI>1 to determine one PUCCH resources among four PUCCH resources (step S220). In the above case, the UE transmits ACK/NACK by using a PUCCH format 3. In this case, an ARO field included in the DL DCI with DAI>1 is used when the PUCCH resource for the PUCCH format 3 is determined.

The UE uses a TPC field included in the DL DCI with DAI>1 for its original use, i.e., for transmission power control (step S230).

Hereinafter, examples of determining a PUCCH resource are described for each of the aforementioned cases 1 to 3. In the following example, embodiments applicable to FDD and TDD are described sequentially with respect to each of cases where the ARO field is not included in a DL DCI transmitted through an E-PDCCH, i.e., a TPC field is alternatively used as an ARI, and where the ARO field is included in a DL DCI transmitted through an E-PDCCH. In case of using the ARO field in TDD, a PUCCH format which is a target of the ARO field may vary depending on which cell is scheduled and depending on a DAI value. The ARO value may vary depending on a PUCCH format which is a target of indication and depending on whether to use an implicit/explicit resource. The same value may be used for the same PUCCH format which uses the explicit resource. For example, when the PUCCH format 3 is configured, in DL subframes associated with one UL subframe, an ARO value based on a PUCCH format 1a/1b and an ARO value based on the PUCCH format 3 are configured independently from each other, and an ARO value for the same PUCCH format is configured equally. When the PUCCH format 1a/1b is used, only one piece of control information is transmitted, and thus there is no target for using the same value. In case of a channel selection using the PUCCH format 1b, an ARO value based on an implicit PUCCH format 1b resource is configured independently in DL subframes associated with one UL subframe, and is also configured independently from an ARO value based on an explicit PUCCH format 1b resource. ARO values based on the explicit PUCCH format 1b resource use the same value.

Hereinafter, an ARO field indicates a field added to a DL DCI of the aforementioned E-PDCCH, and an ARI field indicates a field indicating a PUCCH resource used for ACK/NACK transmission. A TPC field may be conventionally dedicated as the ARI field, whereas in the present invention, the ARO field (i.e., additional ARI field) may be dedicated as the ARI field.

<FDD>

How to use an ARI field in a DL DCI of an E-PDCCH is described according to whether cross carrier scheduling or self-scheduling is configured.

<1$^{st}$ Embodiment>

In all of the three cases 1 to 3 above, a TCP field of a DL DCI transmitted through an E-PDCCH may be alternatively used as an ARI. In the case 1, a TPC field included in a DL DCI of an E-PDCCH is used as the ARI. Therefore, disadvantageously, a UE must acquire information for power control from a TPC of a DL DCI transmitted through not the E-PDCCH but the PDCCH, or must receive the information by using only a DCI format 3/3A. However, since a new field is not added, there is an advantage in that a length of the DL DCI is the same as in the conventional case.

The TPC field of the case 1 above is used as an offset for an implicit PUCCH format 1.

When a PUCCH format 3 is configured, the TPC field of the cases 2 and 3 above is used for resource selection of an explicit PUCCH format 3.

When the channel selection using the PUCCH format 1b is configured, the TPC field of the case 2 above is used as an offset of the implicit PUCCH format 1b, and the TPC field of the case 3 above is used for resource selection of an explicit PUCCH format 1b.

<2$^{nd}$ Embodiment>

For all of the cases 1 to 3 above, a BS may add an ARO field to a DL DCI transmitted through an E-PDCCH. In the cases 2 and 3, a TPC field may not be alternatively used as an ARI field but be used for power control.

In the case 1 above, the ARO field may be used as an offset for resource selection of an implicit PUCCH format1.

When a PUCCH format 3 is configured, the ARO field for the cases 2 and 3 above is used for resource selection of an explicit PUCCH format 3.

When the channel selection using the PUCCH format 1b is configured, the ARO field for the case 2 above is used as an offset for the implicit PUCCH format 1b, and the ARO field in the case of 3 above is used for resource selection of an explicit PUCCH format 1b.

When the PUCCH format 3 is configured, the TPC field of the cases 2 and 3 may be utilized to indicate that only a corresponding secondary cell is scheduled. That is, similarly to a case where only a primary cell is scheduled, only ACK/NACK of a corresponding secondary cell may be transmitted by using the PUCCH format 1a/1b.

When only the secondary cell is scheduled, the ARO field of the case 2 above is used as the offset of the implicit PUCCH format 1a/1b, and the ARO field of the case 3 above is used for resource selection of the explicit PUCCH format 1a/1b.

<3$^{rd}$ Embodiment>

In the case 1 above, an additional ARO field may be included/used in a DCI transmitted through an E-PDCCH. In the cases 2 and 3 above, the TPC field may be used as an ARI field similarly to the conventional case.

A DCI for scheduling a primary cell requires a TPC field to allow TPC transmission. Therefore, the TPC field is used for its original use, and additionally includes an ARO field. On the other hand, the ARO field is not added to a DCI for scheduling a secondary cell.

In this case, the ARO field of the case 1 is used as an offset of an implicit PUCCH format 1. If a PUCCH format 3 is configured, when the TCP field is alternatively used as an ARI, it is used for selection of an explicit PUCCH format 3. When the channel selection using the PUCCH format 1b is configured, the TPC field of the case 2 above is alternatively used as the ARI, and is used as an offset of an implicit PUCCH format 1b. The TPC field of the case 3 above is alternatively used as the ARI, and is used for selection of an explicit PUCCH format 1b.

<4$^{th}$ Embodiment>

In the cases 1 and 2 above, an ARO field is added. A TPC field of the cases 2 and 3 above is alternatively used as an ARI.

A DCI for scheduling a primary cell must allow TPC transmission, and thus a TPC field is required. Accordingly, the ARO field is additionally included in addition to the TPC field.

This is for maintaining sharing of a search space of a DCI for secondary cell scheduling and primary cell scheduling to decrease a blocking probability in case of cross carrier scheduling. In case of self-scheduling, an additional ARO field is not included since sharing of the search space is not applied.

The ARO field of the case 1 above is used as the offset of an implicit PUCCH format 1.

When a PUCCH format 3 is configured, the TPC field of the cases 2 and 3 above is alternatively used as the ARI, and is used for resource selection of an explicit PUCCH format 3. Alternatively, the ARO field of the case 2 above may be used for resource selection of the explicit PUCCH format 3, and the TPC field of the case 3 above may be alternatively used as the ARI and thus may be used for resource selection of the explicit PUCCH format 3.

The ARO field of the case 2 above may be ignored or may be zero padded. Alternatively, when the PUCCH format 3 is configured, the ARO field or the TPC field may be utilized to indicate that only a corresponding secondary cell is scheduled.

In this case, the ARO field or TPC field obtained in the case 2 above may be used as the offset of the implicit PUCCH format 1a/1b.

When the channel selection using the PUCCH format 1b is configured, the TPC field or ARO field of the case 2 above is used as the offset of the implicit PUCCH format 1b. The TPC field of the case 3 above is alternatively used as the ARI, and is used for resource selection of an explicit PUCCH format 1b.

<TDD>

Hereinafter, a method applicable to TDD is described.

<5$^{th}$ Embodiment>

In all of the cases 1, 2, and 3 above, a TPC field of a DL DCI transmitted through an E-PDCCH may be alternatively used as an ARI.

Also in the case 1 above, the TPC field of the DL DCI transmitted through the E-PDCCH is alternatively used as the ARI. Accordingly, for power control, the TPC field may be obtained by using a DL DCI transmitted through a PDCCH or the TPC field may be obtained by using the DCI format 3/3A. Advantageously, there is no need to increase a DCI length in this method.

When a PUCCH format 3 is configured, a TPC field included in an E-PDCCH with DAI=1 of the case 1 above is used as an offset of an implicit PUCCH format 1, and a TPC field included in an E-PDCCH with DAI>1 is used for resource selection of an explicit PUCCH format 3.

When the channel selection using the PUCCH format 1b is configured, the TPC field of the case 1 above is alternatively used as the ARI, and is used as an offset of the implicit PUCCH format 1b. The TPC field of the case 2 above is used as the offset of the implicit PUCCH format 1b. The TPC field of the case 3 above is used for resource selection of the explicit PUCCH format 1b.

<6$^{th}$ Embodiment>

In this method, an ARO field is added to all DL DCIs transmitted through an E-PDCCH.

When a PUCCH format 3 is configured, an ARO field included in an E-PDCCH with DAI=1 of the case 1 above is used as an offset of an implicit PUCCH format 1.

Further, an ARO field included in an E-PDCCH with DAI>1 is used for resource selection of an explicit PUCCH format 3. This process is described above in detail with reference to FIG. 14.

An ARO field of the cases 2 and 3 above is used for resource selection of the explicit PUCCH format 3.

When the channel selection using the PUCCH format 1b is configured, the ARO field of the case 1 above is used as an offset of the implicit PUCCH format 1b, an ARO field of the case 2 above is used as an offset of the implicit PUCCH format 1b, and an ARO field of the case 3 above is used for resource selection of an explicit PUCCH format 1b.

When the PUCCH format 3 is configured, a TPC field included in a PDCCH with DAI=1 in the cases 2 and 3 may be utilized to indicate that only one subframe is scheduled in a corresponding secondary cell. Similarly to a case where only one subframe is scheduled in a primary cell, only ACK/NACK of a corresponding secondary cell may be transmitted by using the PUCCH format 1a/1b.

If it is indicated that only the secondary cell is scheduled, the ARO field included in the PDCCH with DAI=1 of the case 2 above is used as the offset of the implicit PUCCH format 1a/1b. The ARO field included in the PDCCH with DAI=1 of the case 3 above is used for resource selection of the explicit PUCCH format 1a/1b.

<7$^{th}$ Embodiment>

An ARO field is added in the case 1 above. A TPC field is alternatively used as an ARI in the cases of 2 and 3 above.

In this method, since TPC transmission is required in a DCI for scheduling a primary cell, a TPC field is used for its original use, and an ARO field is added. An ARO field is not added to a DCI for scheduling a secondary cell.

When a PUCCH format 3 is configured, an ARO field included in an E-PDCCH with DAI=1 of the case 1 above is used as an offset of an implicit PUCCH format 1, and an ARO field included in an E-PDCCH with DAI>1 is used for resource selection of an explicit PUCCH format 3. The TPC field of the cases 2 and 3 is used for resource selection of the explicit PUCCH format 3.

When the channel selection using the PUCCH format 1b is configured, the ARO field of the case 1 above is used as the offset of the implicit PUCCH format 1b, and the TPC field of the case 2 above is alternatively used as the ARI and is used as the offset of the implicit PUCCH format 1b. The TPC field of the case 3 above is alternatively used as the ARI, and is used for selection of the explicit PUCCH format 1b.

<8$^{th}$ Embodiment>

In this method, an ARO field is added in the cases 1 and 2 above, and a TPC field of the cases 2 and 3 is alternatively used as an ARI.

Since a DCI for scheduling a primary cell requires TPC transmission, a TPC field is used for its original use, and an ARO field used for an ARI is added/used. This is for maintaining sharing of a search space of a DCI for a secondary cell and a DCI for scheduling the primary cell to decrease a blocking probability in case of cross carrier scheduling. In case of self-scheduling, an additional field is not used since sharing of the search space is not applied.

When a PUCCH format 3 is configured, the ARO field with DAI=1 of the case 1 above is used as the offset of an implicit PUCCH format 1. The ARO field with DAI>1 of the case 1 above is used for resource selection of an explicit PUCCH format 3.

The TPC field of the cases 2 and 3 above is alternatively used as the ARI, and is used for resource selection of the explicit PUCCH format 3. Alternatively, the ARO field of the case 2 above is used for resource selection of the explicit PUCCH format 3, and the TPC field of the case 3 above is alternatively used as the ARI and is used for resource selection of the explicit PUCCH format 3.

The ARO field of the case 2 above may be ignored or may be zero padded. Alternatively, when the PUCCH format 3 is configured and DAI=1, the ARO field or the TPC field may be utilized to indicate that only a corresponding secondary cell is scheduled.

The ARO field or TPC field obtained in the case 2 above may be used as the offset of the implicit PUCCH format 1a/1b.

When the channel selection using the PUCCH format 1b is configured, the ARO field of the case 1 above is used as an offset of the implicit PUCCH format 1b, a TPC field or ARO field of the case 2 above is used as an offset of the implicit PUCCH format 1b, and a TPC field of the case 3 above is used for resource selection of an explicit PUCCH format 1b.

According to the present invention, in a method of transmitting ACK/NACK for multiple of CCs and in resource selection, utilizing of a search space, using of a PUCCH resource, and signaling of power control can be more effectively performed.

Figure 15:
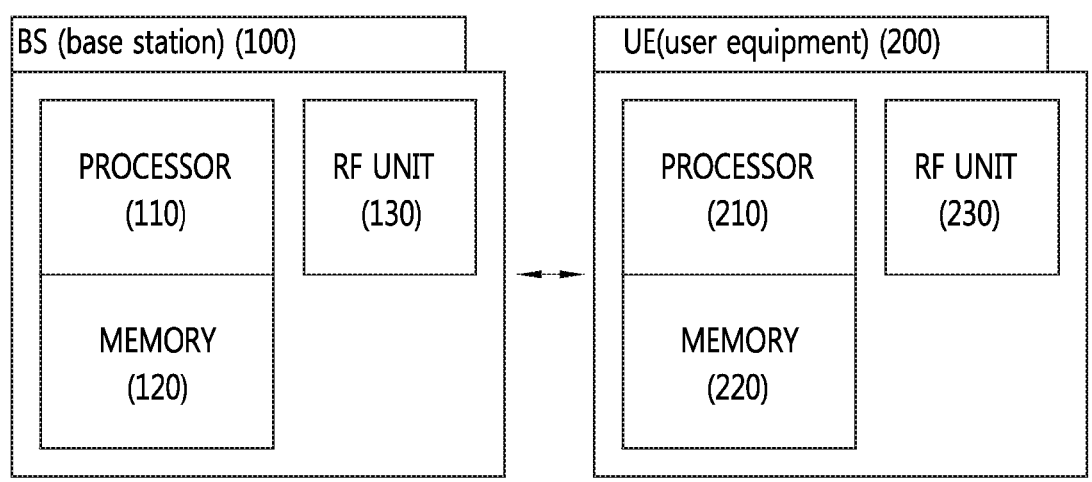
FIG. 15 illustrates configurations of a base station and a user equipment according to an embodiment of the present invention.

FIG. 15 illustrates configurations of a base station and a user equipment according to an embodiment of the present invention.

The base station 100 includes a processor 110, a memory 120, and a radio frequency (RF) unit 130. The processor 110 implements a function, a process, and/or a method which are proposed. The memory 120 is connected with the processor 110 to store various pieces of information for driving the processor 110. The RF unit 130 is connected with the processor 110 to transport and/or receive the radio signal.

The user equipment 200 includes a processor 210, a memory 220, and an RF unit 230. The processor 210 implements a function, a process, and/or a method which are proposed. The memory 220 is connected with the processor 210 to store various pieces of information for driving the processor 210. The RF unit 230 is connected with the processor 210 to transport and/or receive the radio signal.

The processors 110 and 210 may include an application-specific integrated circuit (ASIC), other chipset, a logic circuit, a data processing device, and/or a converter that converts a baseband signal and a radio signal to each other. The memories 120 and 220 may include a read-only memory (ROM), a random access memory (RAM0, a flash memory, a memory card, a storage medium, and/or other storage device. The RF units 130 and 230 may include one or more antennas that transmit and/or receive the radio signal. When the embodiment is implemented by software, the aforementioned technique may be implemented by a module (a process, a function, and the like) that performs the aforementioned function. The module may be stored in the memories 120 and 220 and may be executed by the processors 110 and 210. The memories 120 and 220 may be present inside or outside the processors 110 and 210 and connected with the processors 110 and 210 by various well-known means.

What is claimed is:

1. A method for operating an apparatus in a carrier aggregation system, the method comprising:
configuring, to a user equipment (UE), a plurality of physical uplink control channel (PUCCH) resources by a higher layer signal;
transmitting, to the UE, downlink control information (DCI) including a downlink assignment index (DAI) through an enhanced physical downlink control channel (E-PDCCH) of a first subframe;
transmitting, to the UE, data scheduled by the DCI through a physical downlink shared channel (PDSCH) of the first subframe; and
receiving, from the UE, an acknowledgement (ACK)/not-acknowledgement (NACK) for the data through a physical uplink control channel (PUCCH) in a second subframe,
wherein the DCI transmitted through the E-PDCCH includes an additional field which is not present in DCI transmitted through a physical downlink control channel (PDCCH), and
wherein if the DAI value is greater than 1, the additional field is used for the UE to determine a single resource for the ACK/NACK among the plurality of PUCCH resources configured by the higher layer signal.

2. The method of claim 1, wherein the DCI transmitted through the E-PDCCH includes a transmission power control (TPC) field.

3. The method of claim 2, wherein if the DAI value is greater than 1, the TPC field of the DCI transmitted through the E-PDCCH is used to control uplink transmission power.

4. The method of claim 1, wherein if the DCI transmitted through the E-PDCCH is transmitted in a primary cell and schedules a PDSCH of a secondary cell.

5. The method of claim 1, wherein if the DAI value of the DCI transmitted through the PDCCH is greater than 1, a TPC field included in the DCI transmitted in the PDCCH is used to determine one resource used for ACK/NACK transmission among a plurality of PUCCH resources configured by a higher layer signal.

6. An apparatus operating in a carrier aggregation system, the apparatus comprising:
a transceiver configured to transmit and receive a radio signal; and
a processor operatively coupled to the transceiver,
wherein the processor is configured for:
configuring, to a user equipment (UE), a plurality of physical uplink control channel (PUCCH) resources by a higher layer signal;
transmitting, to the UE, downlink control information (DCI) including a downlink assignment index (DAI) through an enhanced physical downlink control channel (E-PDCCH) of a first subframe;
transmitting, to the UE, data scheduled by the DCI through a physical downlink shared channel (PDSCH) of the first subframe; and
receiving, from the UE, an acknowledgement (ACK)/not-acknowledgement (NACK) for the data through a physical uplink control channel (PUCCH) in a second subframe,
wherein the DCI transmitted through the E-PDCCH includes an additional field which is not present in DCI transmitted through a physical downlink control channel (PDCCH), and
wherein if the DAI value is greater than 1, the additional field is used for the UE to determine a single resource for the ACK/NACK among the plurality of PUCCH resources configured by the higher layer signal.

7. The apparatus of claim 6, wherein the DCI transmitted through the E-PDCCH includes a transmission power control (TPC) field.

8. The apparatus of claim 7, wherein if the DAI value is greater than 1, the TPC field of the DCI transmitted through the E-PDCCH is used to control uplink transmission power.

9. The apparatus of claim 6, wherein if the DCI transmitted through the E-PDCCH is transmitted in a primary cell and schedules a PDSCH of a secondary cell.

10. The apparatus of claim 6, wherein if the DAI value of the DCI transmitted through the PDCCH is greater than 1, a TPC field included in the DCI transmitted in the PDCCH is used to determine one resource used for ACK/NACK transmission among a plurality of PUCCH resources configured by a higher layer signal.

* * * * *